US012739372B2

(12) United States Patent
Ikeda

(10) Patent No.: US 12,739,372 B2
(45) Date of Patent: Sep. 15, 2026

(54) IMAGE PROCESSING DEVICE AND IMAGE PROCESSING METHOD

(71) Applicant: Sony Group Corporation, Tokyo (JP)

(72) Inventor: Masaru Ikeda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 19/032,947

(22) Filed: Jan. 21, 2025

(65) Prior Publication Data

US 2025/0168335 A1 May 22, 2025

Related U.S. Application Data

(63) Continuation of application No. 17/423,125, filed as application No. PCT/JP2020/005473 on Feb. 13, 2020, now abandoned.

(Continued)

(51) Int. Cl.

| | |
|---|---|
| ***H04N 19/117*** | (2014.01) |
| ***H04N 19/176*** | (2014.01) |
| ***H04N 19/186*** | (2014.01) |
| ***H04N 19/80*** | (2014.01) |
| ***H04N 19/86*** | (2014.01) |

(52) U.S. Cl.

CPC ......... *H04N 19/117* (2014.11); *H04N 19/176* (2014.11); *H04N 19/186* (2014.11); *H04N 19/80* (2014.11); *H04N 19/86* (2014.11)

(58) Field of Classification Search

None

See application file for complete search history.

(56) References Cited

U.S. PATENT DOCUMENTS

2013/0251029 A1 9/2013 Ikeda
2013/0251050 A1* 9/2013 Ikeda .................... H04N 19/86 375/240.29

(Continued)

FOREIGN PATENT DOCUMENTS

WO 2012/098790 A1 7/2012
WO 2013/034649 A1 3/2013
WO 2015/006662 A2 1/2015

OTHER PUBLICATIONS

International Search Report and Written Opinion mailed on Apr. 14, 2020, received for PCT Application PCT/JP2020/005473, Filed on Feb. 13, 2020, 12 pages including English Translation.

(Continued)

*Primary Examiner* — James M Anderson, II

(74) *Attorney, Agent, or Firm* — XSENSUS LLP

(57) ABSTRACT

A decision unit decides whether or not a deblocking filter is applied to color difference components of pixels belonging to a line orthogonal to a block boundary in two adjacent blocks adjacent to each other sandwiching the block boundary of the decoded image, by using color difference components of pixels belonging to a line identical to a line used to decide whether or not the deblocking filter is applied to luminance components of the pixels belonging to the line orthogonal to the block boundary. The filtering unit applies the deblocking to the color difference components of the pixels for which it is decided that the deblocking filter is applied. The present technology can be applied to, for example, a case where encoding and decoding of an image are performed.

12 Claims, 18 Drawing Sheets

Related U.S. Application Data

(60) Provisional application No. 62/811,104, filed on Feb. 27, 2019.

(56) References Cited

U.S. PATENT DOCUMENTS

| | | | | |
|---|---|---|---|---|
| 2014/0185689 | A1* | 7/2014 | Narroschke .......... | H04N 19/176 375/240.24 |
| 2015/0016550 | A1* | 1/2015 | Kim ...................... | H04N 19/86 375/240.29 |
| 2015/0350687 | A1 | 12/2015 | Zhai et al. | |

OTHER PUBLICATIONS

Chen et al., “Algorithm Description for Versatile Video Coding and Test Model 2 (VTM 2)”, Joint Video Experts Team (JVET) of ITU-T SG 16 WP 3 and ISO/IEC JTC 1/SC 29/WG 11, JVET-K1002-v1, Jul. 10-18, 2018, pp. 1-19.

Andersson et al., “CE11: Long Deblocking Filters for Luma (CE11.1.1) and for both Luma and Chroma (CE11.1.9)”, Joint Video Experts Team (JVET) of ITU-T SG 16 WP 3 and ISO/IEC JTC 1/SC 29/WG 11, JVET-L0072, Oct. 3-12, 2018, pp. 1-7.

Ikeda et al., “CE11.1.6, CE11.1.7 and CE11.1.8: Joint Proposals for Long Deblocking from Sony, Qualcomm, Sharp, Ericsson”, Joint Video Experts Team (JVET) of ITU-T SG 16 WP 3 and ISO/IEC JTC 1/SC 29/WG 11, JVET-M0471, Jan. 9-18, 2019, pp. 1-11.

Kim et al. “Improvement of chroma deblock”, Joint Video Exploration Team “JVET” of ITU-T SG 16 WP 3 and ISO/IEC JTC 1/SC 29/WG 11, 4th meeting, Chengdu CN, Oct. 2016 (Year: 2016).

* cited by examiner

FIG. 1

BACKGROUND ART

| bS | Y | U | V |
|---|---|---|---|
| 2 | CONDITION RELATED TO INTRA PREDICTION (CONDITION A) | | |
| 1 | CONDITION RELATED TO PRESENCE OR ABSENCE OF SIGNIFICANT COEFFICIENT OF Y (CONDITION B1) | N/A | |
| | CONDITION RELATED TO MV AND REFERENCE PICTURE (CONDITION B2) | N/A | |
| 0 | Others | | |

FIG. 2

BACKGROUND ART

| bS | Y | U | V |
|---|---|---|---|
| 2 | CONDITION RELATED TO INTRA PREDICTION (CONDITION A) | | |
| 1 | CONDITION RELATED TO PRESENCE OR ABSENCE OF SIGNIFICANT COEFFICIENT OF Y (CONDITION B1) | | |
| | CONDITION RELATED TO MV AND REFERENCE PICTURE (CONDITION B2) | | |
| 0 | Others | | |

FIG. 3
BACKGROUND ART

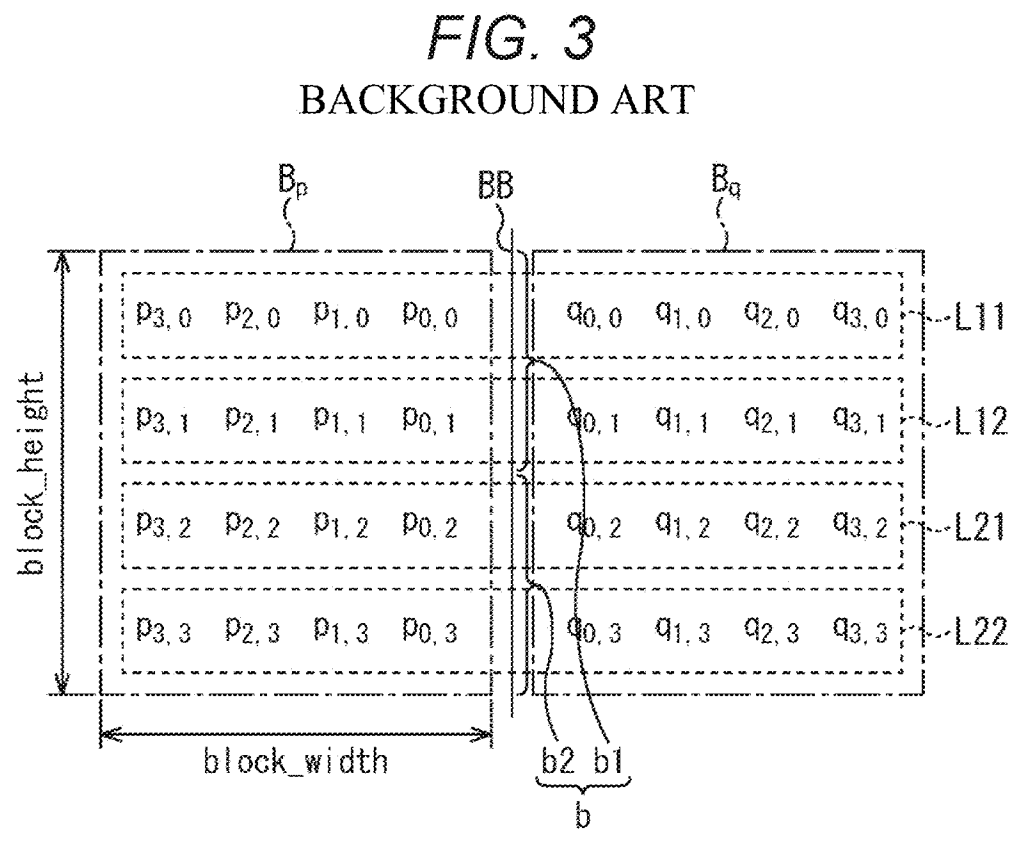

Bp
Bq
BB
L11
L12
L21
L22
$p_{3,0}$ $p_{2,0}$ $p_{1,0}$ $p_{0,0}$ $q_{0,0}$ $q_{1,0}$ $q_{2,0}$ $q_{3,0}$
$p_{3,1}$ $p_{2,1}$ $p_{1,1}$ $p_{0,1}$ $q_{0,1}$ $q_{1,1}$ $q_{2,1}$ $q_{3,1}$
$p_{3,2}$ $p_{2,2}$ $p_{1,2}$ $p_{0,2}$ $q_{0,2}$ $q_{1,2}$ $q_{2,2}$ $q_{3,2}$
$p_{3,3}$ $p_{2,3}$ $p_{1,3}$ $p_{0,3}$ $q_{0,3}$ $q_{1,3}$ $q_{2,3}$ $q_{3,3}$
b1
b2
b
block_width
block_height

FIG. 4

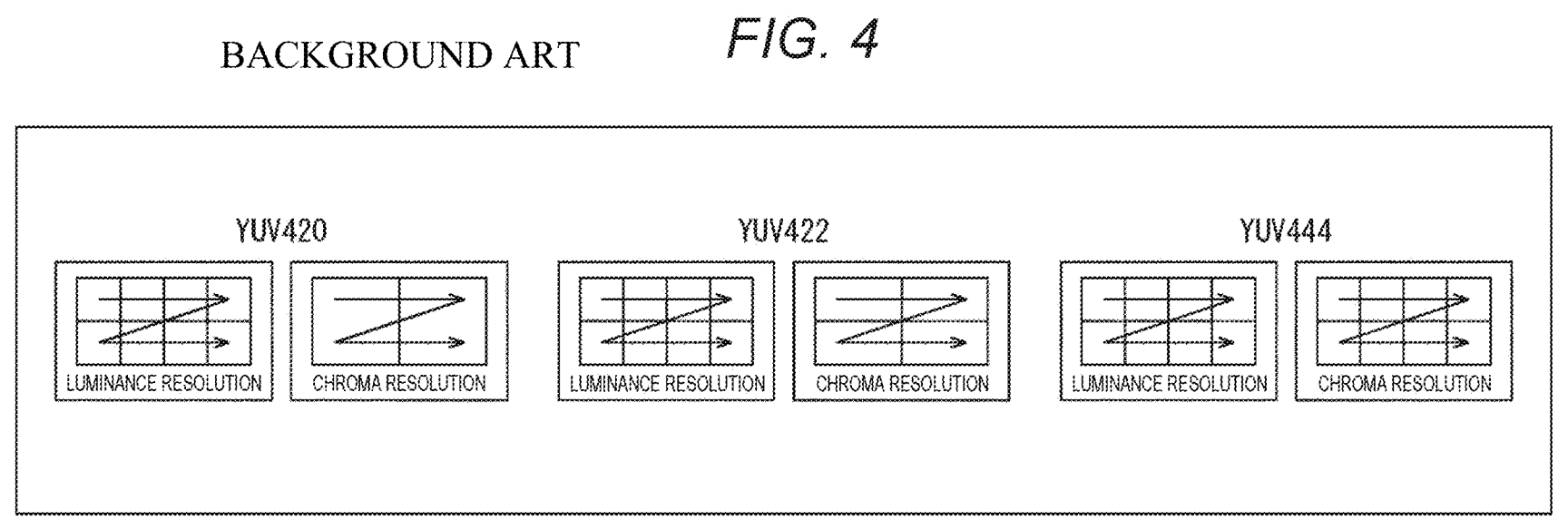

BACKGROUND ART

YUV420

LUMINANCE RESOLUTION

CHROMA RESOLUTION

YUV422

LUMINANCE RESOLUTION

CHROMA RESOLUTION

YUV444

LUMINANCE RESOLUTION

CHROMA RESOLUTION

FIG. 5

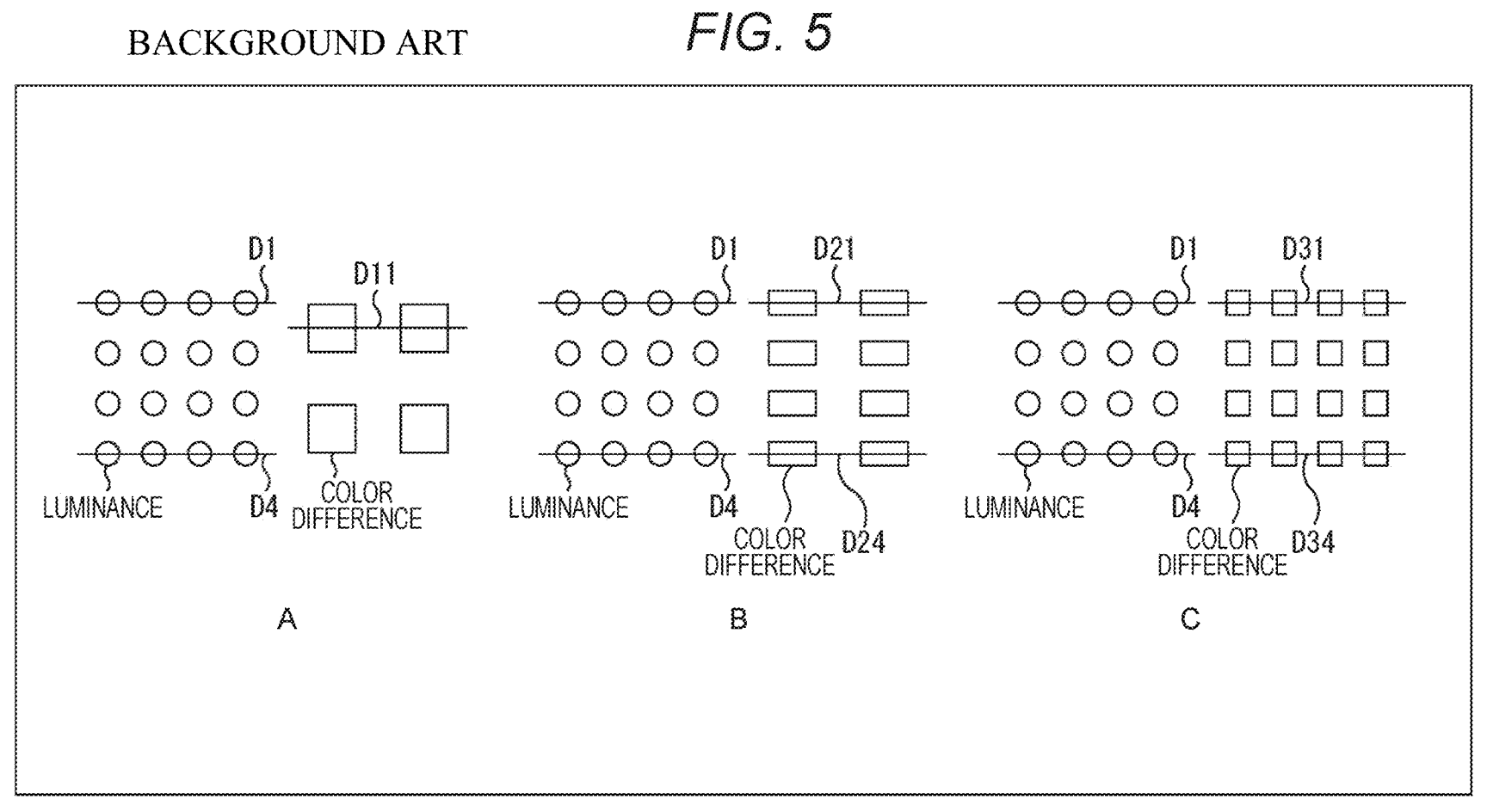

BACKGROUND ART

D1
D4
LUMINANCE
D11
COLOR DIFFERENCE
A

D1
D4
LUMINANCE
D21
D24
COLOR DIFFERENCE
B

D1
D4
LUMINANCE
D31
D34
COLOR DIFFERENCE
C

D51
D54
LUMINANCE
D61
COLOR DIFFERENCE
A
D71
B
D81
D84
C

330
LINE BUFFER
320
FILTERING UNIT
FILTER IMAGE (DECODED IMAGE AFTER FILTERING)
CONTROLLER
340
312
FILTERING STRENGTH DECISION UNIT
DECISION UNIT
310
311
FILTERING DECISION UNIT
261
BOUNDARY STRENGTH CALCULATION UNIT
DECODED IMAGE
FLAG INDICATING PRESENCE OR ABSENCE OF SIGNIFICANT COEFFICIENT OF EACH COMPONENT
DEBLOCKING FILTER
31a/31b

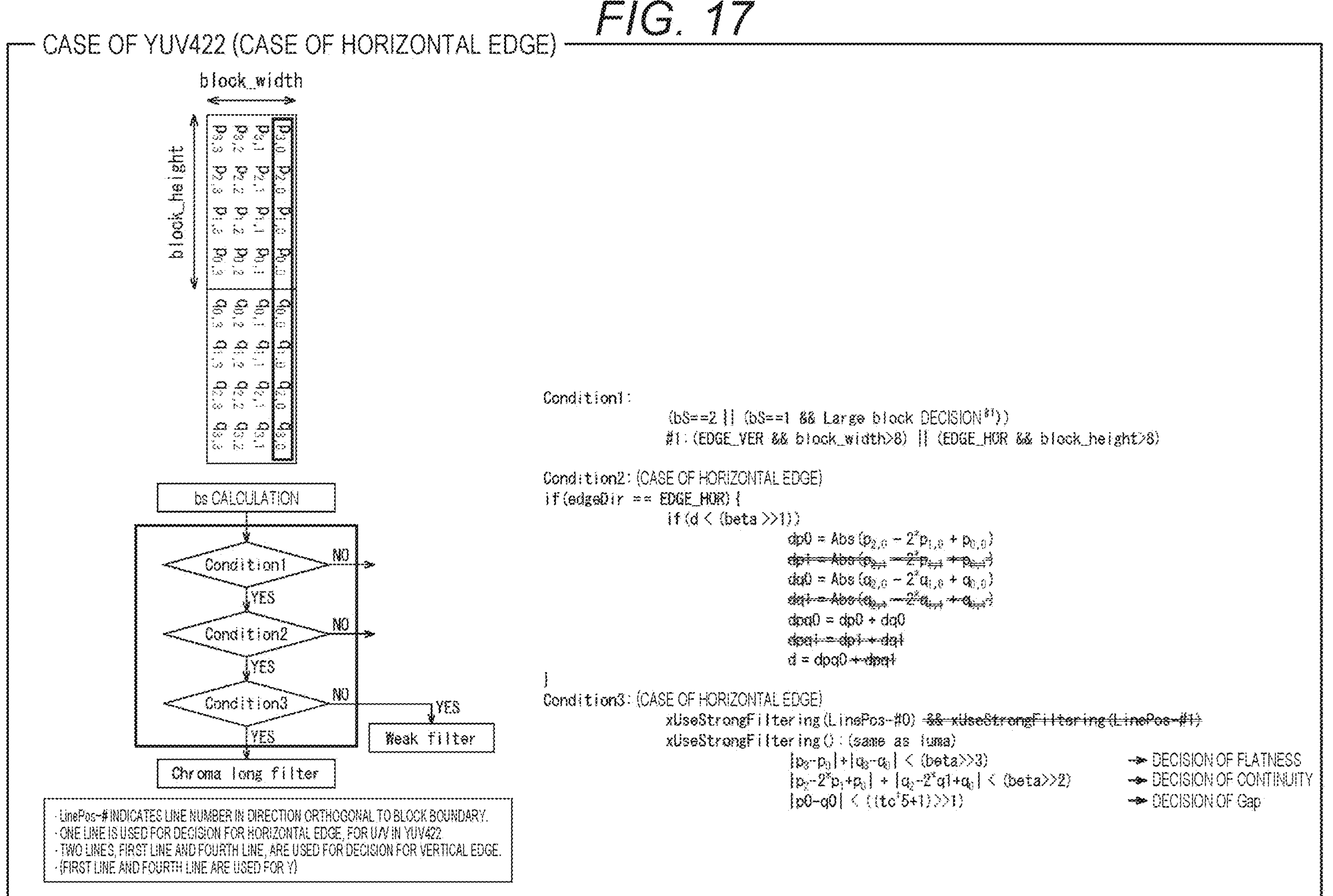
FIG. 17
CASE OF YUV422 (CASE OF HORIZONTAL EDGE)
block_width
block_height
bs CALCULATION
Condition1
Condition2
Condition3
YES
NO
Weak filter
Chroma long filter
·LinePos-# INDICATES LINE NUMBER IN DIRECTION ORTHOGONAL TO BLOCK BOUNDARY.
·ONE LINE IS USED FOR DECISION FOR HORIZONTAL EDGE, FOR U/V IN YUV422.
·TWO LINES, FIRST LINE AND FOURTH LINE, ARE USED FOR DECISION FOR VERTICAL EDGE.
·(FIRST LINE AND FOURTH LINE ARE USED FOR Y)
Condition1:
(bS==2 || (bS==1 && Large block DECISION#1))
#1: (EDGE_VER && block_width>8) || (EDGE_HOR && block_height>8)
Condition2: (CASE OF HORIZONTAL EDGE)
if(edgeDir == EDGE_HOR) {
if(d < (beta >>1))
dp0 = Abs(p2,0 - 2*p1,0 + p0,0)
dq0 = Abs(q2,0 - 2*q1,0 + q0,0)
dpq0 = dp0 + dq0
d = dpq0
}
Condition3: (CASE OF HORIZONTAL EDGE)
xUseStrongFiltering(LinePos-#0)
xUseStrongFiltering(): (same as luma)
|p3-p0|+|q3-q0| < (beta>>3)
|p2-2*p1+p0| + |q2-2*q1+q0| < (beta>>2)
|p0-q0| < ((tc*5+1)>>1)
DECISION OF FLATNESS
DECISION OF CONTINUITY
DECISION OF Gap

FIG. 18

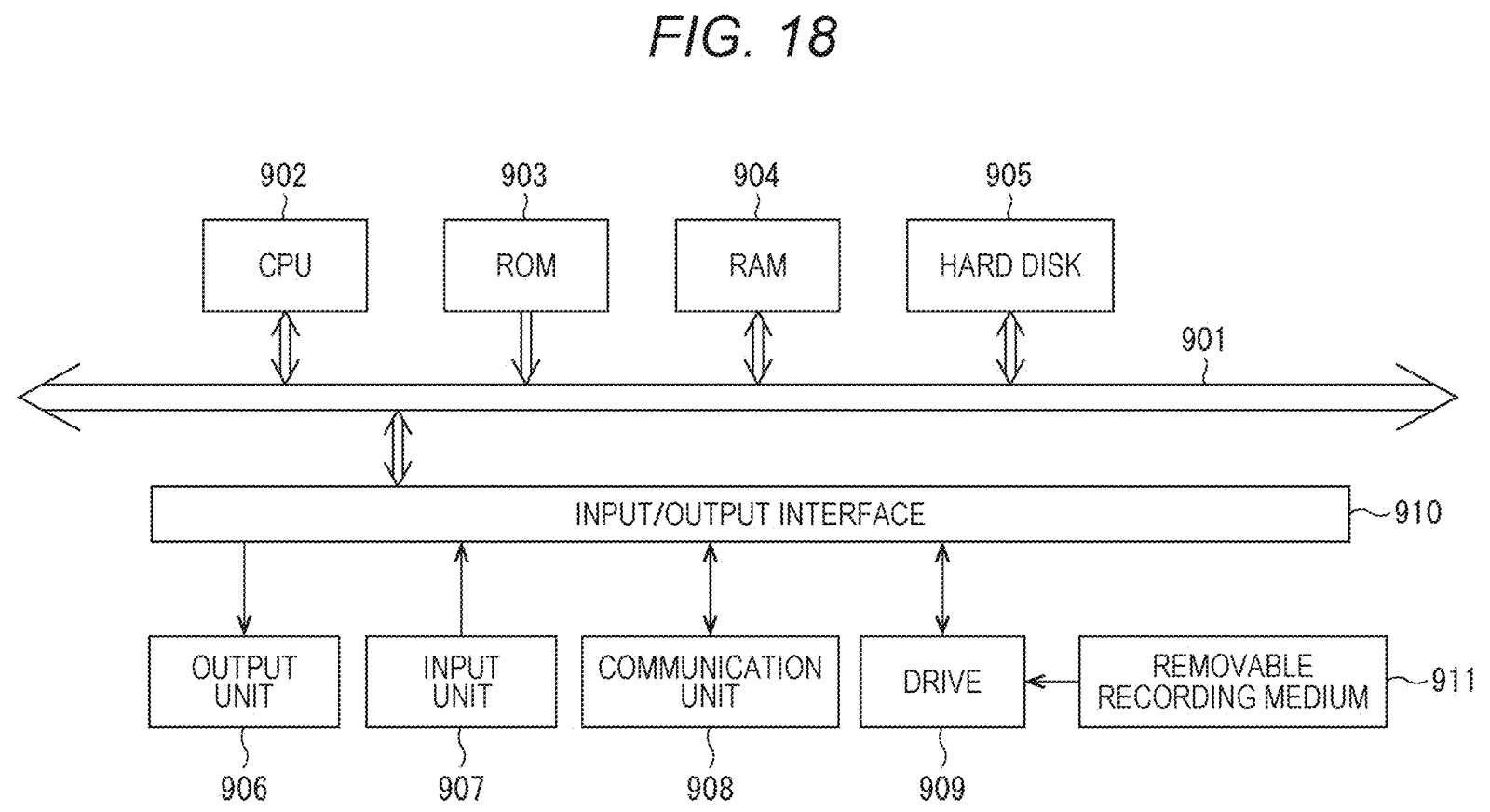

901
902 CPU
903 ROM
904 RAM
905 HARD DISK
910 INPUT/OUTPUT INTERFACE
906 OUTPUT UNIT
907 INPUT UNIT
908 COMMUNICATION UNIT
909 DRIVE
911 REMOVABLE RECORDING MEDIUM

IMAGE PROCESSING DEVICE AND IMAGE PROCESSING METHOD

CROSS-REFERENCE TO RELATED APPLICATIONS

The present application is a continuation of U.S. application Ser. No. 17/423,125, filed Jul. 15, 2021, which is based on PCT filing PCT/JP2020/005473, filed Feb. 13, 2020, which claims priority to U.S. Provisional Patent Application No. 62/811,104, filed Feb. 27, 2019, the entire contents of each are incorporated herein by reference.

TECHNICAL FIELD

The present technology relates to an image processing device and an image processing method, and more particularly to an image processing device and an image processing method that make it possible to unify processes of a luminance component and a color difference component, for example.

BACKGROUND ART

In Joint Video Experts Team (JVET) that is a joint standardization organization of ITU-T and ISO/IEC, for the purpose of further improving coding efficiency compared to H.265/HEVC, standardization work of Versatile Video Coding (VVC) is underway that is a next-generation image coding method.

In the standardization work of VVC, in Non-Patent Document 1, a method has been devised that the deblocking filter that can be applied to the color difference component is changed to two types similarly to the deblocking filter that can be applied to the luminance component, and the strong filter can be applied also to the color difference component.

CITATION LIST

Non-Patent Document

Non-patent document 1: Jianle Chen, Yan Ye, Seung Hwan Kim: Algorithm description for Versatile Video Coding and Test Model 2 (VTM 2), Joint Video Experts Team (JVET) of ITU-T SG 16 WP 3 and ISO/IEC JTC 1/SC 29/WG 11 11th Meeting, Ljubljana, SI, 10-18 Jul. 2018.

SUMMARY OF THE INVENTION

Problems to be Solved by the Invention

In Non-Patent Document 1, the processes of the luminance component and the color difference component are not unified.

The present technology has been made in view of such a situation, and makes it possible to unify the processes of the luminance component and the color difference component.

Solutions to Problems

A first image processing device of the present technology is an image processing device including: a decoding unit that decodes a bitstream to generate a decoded image; a decision unit that decides whether or not a deblocking filter is applied to color difference components of pixels belonging to a line orthogonal to a block boundary in two adjacent blocks adjacent to each other sandwiching the block boundary of the decoded image generated by the decoding unit, by using color difference components of pixels belonging to a line identical to a line used to decide whether or not the deblocking filter is applied to luminance components of the pixels belonging to the line orthogonal to the block boundary; and a filtering unit that applies the deblocking filter to the color difference components of the pixels for which it is decided by the decision unit that the deblocking filter is applied.

A first image processing method of the present technology is an image processing method including: decoding a bitstream to generate a decoded image; deciding whether or not a deblocking filter is applied to color difference components of pixels belonging to a line orthogonal to a block boundary in two adjacent blocks adjacent to each other sandwiching the block boundary of the decoded image, by using color difference components of pixels belonging to a line identical to a line used to decide whether or not the deblocking filter is applied to luminance components of the pixels belonging to the line orthogonal to the block boundary; and applying the deblocking filter to the color difference components of the pixels for which it is decided that the deblocking filter is applied.

In the first image processing device and image processing method of the present technology, a bitstream is decoded to generate a decoded image. Furthermore, whether or not a deblocking filter is applied to color difference components of pixels belonging to a line orthogonal to a block boundary in two adjacent blocks adjacent to each other sandwiching the block boundary of the decoded image, is decided by using color difference components of pixels belonging to a line identical to a line used to decide whether or not the deblocking filter is applied to luminance components of the pixels belonging to the line orthogonal to the block boundary. Then, the deblocking filter is applied to the color difference components of the pixels for which it is decided that the deblocking filter is applied.

A second image processing device of the present technology is an image processing device including: a decision unit that decides whether or not a deblocking filter is applied to color difference components of pixels belonging to a line orthogonal to a block boundary in adjacent blocks adjacent to each other sandwiching the block boundary of a locally decoded image locally decoded when an image is encoded, by using color difference components of pixels belonging to a line identical to a line used to decide whether or not the deblocking filter is applied to luminance components of the pixels belonging to the line orthogonal to the block boundary; a filtering unit that applies the deblocking filter to the color difference components of the pixels for which it is decided by the decision unit that the deblocking filter is applied, to generate a filter image; and an encoding unit that encodes the image by using the filter image generated by the filtering unit.

A second image processing method of the present technology is an image processing method including: deciding whether or not a deblocking filter is applied to color difference components of pixels belonging to a line orthogonal to a block boundary in adjacent blocks adjacent to each other sandwiching the block boundary of a locally decoded image locally decoded when an image is encoded, by using color difference components of pixels belonging to a line identical to a line used to decide whether or not the deblocking filter is applied to luminance components of the pixels belonging to the line orthogonal to the block boundary; applying the deblocking filter to the color difference components of the pixels for which it is decided that the deblocking filter is applied, to generate a filter image; and encoding the image by using the filter image.

In the second image processing device and image processing method of the present technology, whether or not a deblocking filter is applied to color difference components of pixels belonging to a line orthogonal to a block boundary in adjacent blocks adjacent to each other sandwiching the block boundary of a locally decoded image locally decoded when an image is encoded, is decided by using color difference components of pixels belonging to a line identical to a line used to decide whether or not the deblocking filter is applied to luminance components of the pixels belonging to the line orthogonal to the block boundary. Furthermore, the deblocking filter is applied to the color difference components of the pixels for which it is decided that the deblocking filter is applied, and a filter image is generated. Then, the image is encoded by using the filter image.

Note that, the image processing device can be implemented by causing a computer to execute a program. The program can be provided by being recorded on a recording medium or by being transmitted via a transmission medium.

BRIEF DESCRIPTION OF DRAWINGS

FIG. 1 is a diagram explaining a method of calculating bS in HEVC.

FIG. 2 is a diagram explaining a method of calculating bS.

FIG. 3 is an explanatory diagram illustrating an example of color difference components (U component and V component) in two blocks Bp and Bq adjacent to each other sandwiching a vertical block boundary BB.

FIG. 4 is a diagram illustrating an example of a color format (chroma format) of an image.

FIG. 5 is a diagram explaining filtering decision for a deblocking filter applied to (pixels in the horizontal direction orthogonal to) a vertical block boundary.

FIG. 17 is a diagram explaining filtering decision in a case where the color format is the YUV422 format.

FIG. 18 is a block diagram illustrating a configuration example of an embodiment of a computer.

MODE FOR CARRYING OUT THE INVENTION

Figure 6:
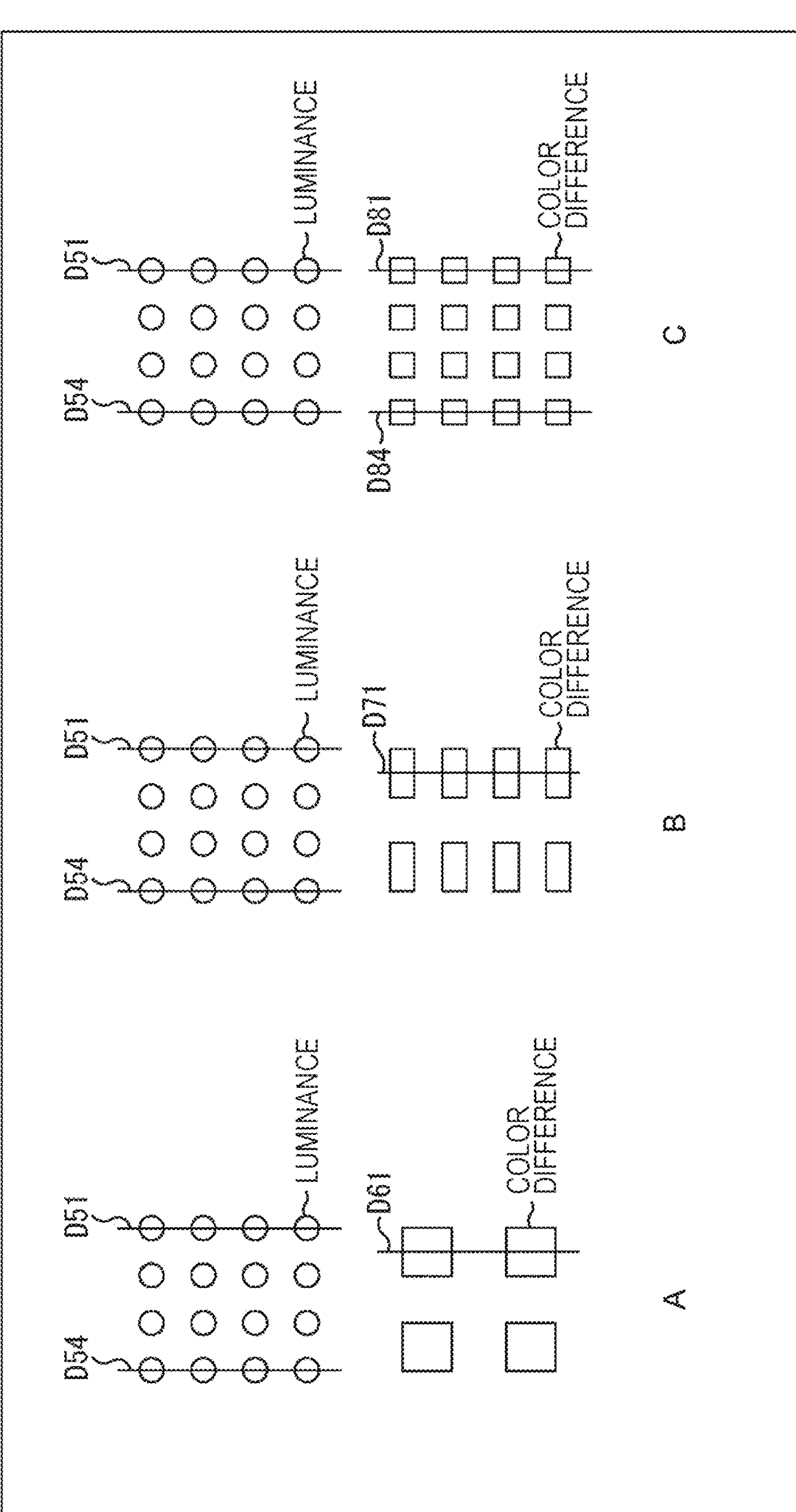
FIG. 6 is a diagram explaining filtering decision of a deblocking filter applied to (pixels in the vertical direction orthogonal to) a horizontal block boundary.

The scope disclosed in the present specification is not limited to the content of the embodiments, and the content of the following reference documents REF1 to REF8 known at the time of filing is also incorporated herein by reference. That is, the content described in the following reference documents REF1 to REF8 is also a basis for determining support requirements. For example, even in a case where a Quad-Tree Block Structure described in the reference document REF2, a Quad Tree Plus Binary Tree (QTBT) Block Structure described in the reference document REF3, and a Multi-type Tree (MTT) Block Structure described in the reference documents REF4, REF5, and REF8 are not directly defined in the detailed description of the invention, they are still within the scope of the present disclosure and shall meet the support requirements of the claims. Furthermore, similarly, even in a case where technical terms, for example, parsing, syntax, semantics, and the like are not directly defined in the detailed description of the invention, they are still within the scope of the present disclosure and shall meet the support requirements of the claims.

REF1: Recommendation ITU-T H.264 (April 2017) "Advanced video coding for generic audiovisual services", April 2017

REF2: Recommendation ITU-T H.265 (December 2016) "High efficiency video coding", December 2016

REF3: J. Chen, E. Alshina, G. J. Sullivan, J.-R. Ohm, J. Boyce, "Algorithm Description of Joint Exploration Test Model (JEM7)", JVET-G1001, Joint Video Exploration Team (JVET) of ITU-T SG 16 WP 3 and ISO/IEC JTC 1/SC 29/WG 11 7th Meeting: Torino, IT, 13-21 Jul. 2017

REF4: B. Bross, J. Chen, S. Liu, "Versatile Video Coding (Draft 3)," JVET-L1001, Joint Video Experts Team (JVET) of ITU-T SG 16 WP 3 and ISO/IEC JTC 1/SC 29/WG 11 12th Meeting: Macau, CN, 312 October 2018

REF5: J. J. Chen, Y. Ye, S. Kim, "Algorithm description for Versatile Video Coding and Test Model 3 (VTM 3)", JVET-L1002, Joint Video Experts Team (JVET) of ITU-T SG 16 WP 3 and ISO/IEC JTC 1/SC 29/WG 11 12th Meeting: Macau, CN, 312 October 2018

REF6: J. Boyce (Intel), Y. Ye (InterDigital), Y.-W. Huang (Mediatek), M. Karczewicz (Qualcomm), E. Francois (Technicolor), W. Husak (Dolby), J. Ridge (Nokia), A. Abbas (GoPro), "Two tier test model", JVET-J0093, Joint Video Experts Team (JVET) of ITU-T SG 16 WP 3 and ISO/IEC JTC 1/SC 29/WG 11 10th Meeting: San Diego, US, 120 April 2018

REF7: S. De-Luxan-Hernandez, V. George, J. Ma, T. Nguyen, H. Schwarz, D. Marpe, T. Wiegand (HHI), "CE3: Intra Sub-Partitions Coding Mode (Tests 1.1.1 and 1.1.2)", JVET-M0102, Joint Video Experts Team (JVET) of ITU-T SG 16 WP 3 and ISO/IEC JTC 1/SC 29/WG 11 13th Meeting: Marrakech, MA, 918 January 2019

REF8: M. Ikeda, T. Suzuki (Sony), D. Rusanovskyy, M. Karczewicz (Qualcomm), W. Zhu, K. Misra, P. Cowan, A. Segall (Sharp Labs of America), K. Andersson, J. Enhorn, Z. Zhang, R. Sjoberg (Ericsson), "CE11.1.6, CE11.1.7 and CE11.1.8: Joint proposals for long deblocking from Sony, Qualcomm, Sharp, Ericsson", JVET-M0471, Joint Video Experts Team (JVET) of ITU-T SG 16 WP 3 and ISO/IEC JTC 1/SC 29/WG 11 13th Meeting: Marrakesh, MA, 918 January 2019

Definition

In this application, the following terms are defined as follows.

Color difference-related parameters mean all parameters related to color difference. For example, the color difference-related parameters may include information regarding orthogonal transform coefficients of color difference component, for example, orthogonal transform coefficients (quantization coefficients) of the color difference component included in any blocks such as a Transform Unit (TU), a Prediction Unit (PU), a Coding Unit (CU), and others, a flag indicating presence or absence of a significant coefficient (non-zero orthogonal transform coefficient) of the color difference component in each block, and the like. The color difference-related parameters are not limited to such examples, and may be various parameters related to the color difference.

Application necessity of a deblocking filter means whether or not the deblocking filter is applied. The application necessity decision of the deblocking filter means deciding whether or not the deblocking filter is applied. Furthermore, a decision result of the application necessity decision is a result of deciding whether or not the deblocking filter is applied. The decision result of the application necessity decision may be information indicating either “apply” or “not apply”.

The filtering strength decision means deciding (determining) filtering strength of a deblocking filter in a case where the deblocking filter is applied. For example, in a case where there are a weak filter, and a chroma long filter having a larger number of taps, that is, stronger filtering strength, than the weak filter, as a deblocking filter of the color difference component, in the filtering strength decision, it is decided (determined) which of the weak filter and the chroma long filter is used as the deblocking filter to be applied to the color difference component.

Regarding the deblocking filter of the color difference component, the application necessity decision and the filtering strength decision decide that the deblocking filter is not applied or a type of the deblocking filter to be applied.

For example, in a case where there are the weak filter and the chroma long filter as the deblocking filter of the color difference component, in the application necessity decision and the filtering strength decision, it is decided that the deblocking filter is not applied to the color difference component, the weak filter is applied, or the chroma long filter is applied. Hereinafter, the application necessity decision and the filtering strength decision are also collectively referred to as filtering decision.

<Overview of Deblocking Filter>

A process related to a deblocking filter in an existing image coding method such as HEVC includes filtering decision (application necessity decision and filtering strength decision) and filtering (application of a filter). In the following, an overview of the deblocking filter will be described using HEVC as an example.

Note that, in the following, the deblocking filter for the color difference component of the decoded image (including a locally decoded image locally decoded at the time of encoding) will be described, and the description of the deblocking filter for the luminance component will be omitted as appropriate.

As a process related to the deblocking filter, first, filtering decision is performed. In the filtering decision, first, application necessity decision is performed for deciding whether or not the deblocking filter is applied to the block boundary of the decoded image.

Note that, in HEVC, the block boundary is identified on the basis of a block structure of a Quad-Tree Block Structure described in the reference document REF2. Specifically, among edges of an 8×8 pixel block (sample grid) that is the minimum block unit, an edge that satisfies a condition that the edge is at least one of a Transform Unit (TU) boundary or a Prediction Unit (PU) boundary is identified as the block boundary in HEVC.

The application necessity decision is performed on the basis of boundary strength (hereinafter also referred to as bS) of the block boundary. In HEVC, when four lines in a direction orthogonal to a partial block boundary (a part of the block boundary), which is a unit of processing when the filtering decision (application necessity decision) of the deblocking filter is performed on the block boundary, are defined as a unit of filter application to which the deblocking filter is applied, the bS is calculated every four lines that are the unit of filter application. In a case where the block boundary is a vertical boundary, a line of the unit of filter application is a line (row) in the horizontal direction orthogonal to the vertical boundary. Furthermore, in a case where the block boundary is a horizontal boundary, a line of the unit of filter application is a line (column) in the vertical direction orthogonal to the horizontal boundary.

FIG. 1 is a diagram explaining a method of calculating bS in HEVC.

As illustrated in FIG. 1, in HEVC, the bS is calculated on the basis of the truth or falsehood (satisfied or not satisfied) of a condition A that is a condition related to intra prediction, a condition B1 that is a condition related to a significant coefficient of the Y component, and a condition B2 that is a condition related to a motion vector (MV) and a reference picture. Referring to FIG. 1, the bS is set to 2 in a case where the condition A is true. Furthermore, in a case where the condition A is false and at least one of the condition B1 or the condition B2 is true, the bS is set to 1. Then, in a case where the condition A, the condition B1, and the condition B2 are all false, the bS is set to 0. Note that, the conditions A, B1, and B2 illustrated in FIG. 1 are as follows. Furthermore, here, for the sake of simplicity, the block boundary is assumed to be a vertical boundary.

Condition A: Among Coding Units (CUs) including pixels of the uppermost line among lines orthogonal to the block boundary that is a calculation target of the bS and sandwiching the block boundary, an encoding mode of at least one of the CUs is an intra prediction mode.

Condition B1: The block boundary is the TU boundary, and among two TUs including pixels of the uppermost line among lines orthogonal to the block boundary that is a calculation target of the bS and sandwiching the block boundary, the significant coefficient of the Y component exists in at least one of the TUS.

Condition B2: Between two CUs including pixels of the uppermost line among lines orthogonal to the block boundary that is a calculation target of the bS and sandwiching the block boundary, an absolute value of a difference between MVs is one pixel or more, or reference pictures of motion compensation are different from each other or the numbers of MVs are different from each other.

Moreover, in HEVC, a deblocking filter for the luminance component (Y component) of the decoded image can be applied to the block boundary for which the bS set as described above is set to greater than or equal to 1. For that reason, in HEVC, the decision result of the application necessity decision of the deblocking filter for the luminance component of the decoded image may differ depending on whether or not the condition B1 and the condition B2 are satisfied.

Note that, in HEVC, as the deblocking filter for the luminance component of the decoded image, the strong filter having a high filtering strength and the weak filter having a low filtering strength are prepared. In a case where the bS is greater than or equal to 1, in a process related to the deblocking filter for the luminance component of the decoded image, application necessity decision based on additional conditions is further performed, and then decision of the filtering strength and filtering are performed. Details of these processes are described in the reference document REF2, and the description thereof is omitted here.

On the other hand, a deblocking filter for the color difference components (U component, V component) of the decoded image in HEVC is applied only to the block boundary whose bS is 2. For that reason, as illustrated in FIG. 1, whether or not the conditions B1 and B2 are satisfied does not affect the application necessity decision of the deblocking filter to the color difference components of the decoded image, in HEVC.

Furthermore, in HEVC, the deblocking filter that can be applied to the color difference components of the decoded image is only the weak filter. For that reason, a filtering strength decision process is not necessary for the color difference components of the decoded image, and in a case where the bS is 2, the weak filter is applied to the color difference components of the decoded image.

By the way, as described in the reference document REF3, in the block division by the QTBT Block Structure in VVC, a block having a larger size can be selected than that in the block division by the Quad-Tree Block Structure in HEVC. In a case where the block size is large in a flat area (an area in which a change in pixel value in the area is small), block distortion is likely to occur. For that reason, in VVC in which a block having a larger size can be selected, in a case where the deblocking filter that can be applied to the color difference components of the decoded image is only the weak filter similarly to HEVC, there has been a possibility that a remarkable block distortion remains in the color difference components. In view of such a situation, it is desired to improve the deblocking filter for the color difference components of the decoded image.

Thus, in Non-Patent Document 1, a method of applying the deblocking filter has been devised, which is different from that in HEVC. In the method of applying the deblocking filter of Non-Patent Document 1, it has been devised that, for example, the deblocking filter that can be applied to the color difference component is changed to two types similarly to the deblocking filter that can be applied to the luminance component, and the strong filter can be applied also to the color difference component. Furthermore, it has also been devised that the deblocking filter can be applied to the color difference components of the decoded image not only in a case where the bS is 2 but also in a case where the bS is 1.

FIG. 2 is a diagram explaining a method of calculating bS in the method of applying the deblocking filter of Non-Patent Document 1.

In the method of applying the deblocking filter of Non-Patent Document 1, the bS is calculated on the basis of the conditions A, B1, and B2 described above, similarly to the example in HEVC illustrated in FIG. 2. However, as described above, the deblocking filter can be applied to the color difference components of the decoded image not only in the case where the bS is 2 but also in the case where the bS is 1. For that reason, as illustrated in FIG. 2, the decision result of the application necessity decision of the deblocking filter for the color difference components (U component, V component) of the decoded image may differ depending on whether or not the condition B1 and the condition B2 are satisfied.

Hereinafter, a description will be given of filtering decision (application necessity decision and filtering strength decision) and filtering regarding a deblocking filter that can be applied to the color difference component of the decoded image in Non-Patent Document 1.

FIG. 3 is a diagram illustrating an example of pixels of color difference components (U component and V component) of a block Bp and a block Bq as two adjacent blocks adjacent to each other sandwiching a vertical block boundary BB that is a block boundary in the vertical direction.

Note that, here, the vertical block boundary will be described as an example, but the matters described for the vertical block boundary can be similarly applied to the horizontal block boundary that is the block boundary in the horizontal direction unless otherwise specified. Furthermore, although FIG. 3 illustrates an example in which the block Bp and the block Bq of the color difference component are blocks of 4×4 pixels, the matters described here can be similarly applied to blocks of other sizes.

In the example of FIG. 3, the color difference component (and pixels of the color difference component) in the block Bp are indicated by symbols $p_{i,j}$. The i is a column index and the j is a row index. The column indexes i are numbered 0, 1, 2, and 3 in order from a column closest to the vertical block boundary BB (from left to right in the figure). The row indexes j are numbered 0, 1, 2, and 3 from top to bottom. On the other hand, the color difference component (and pixels of the color difference component) in the block Bq are indicated by symbols $q_{k,j}$. The k is a column index and the j is a row index. The column indexes k are numbered 0, 1, 2, and 3 in order from a column closest to the vertical block boundary BB (from right to left in the figure).

Note that, here, the block boundary BB is assumed to be the vertical block boundary, but the block boundary BB can be regarded as the horizontal block boundary, and the block Bp and the block Bq can be regarded as two adjacent blocks adjacent to each other sandwiching the horizontal block boundary BB. In this case, in the $p_{i,j}$, the i is a row index and the j is a column index. The same applies to the $q_{k,j}$.

After the bS is calculated as described with reference to FIG. 2, the filtering decision is performed using the following three conditions. In a case where the color format of the decoded image is, for example, the YUV420 format, the filtering decision is performed every two lines of the color difference components.

That is, in the case where the color format of the decoded image is the YUV420 format, a partial vertical block boundary that is a unit of processing when it is decided whether or not the deblocking filter is applied to (pixels in the horizontal direction orthogonal to) the vertical block boundary BB, is a vertical block boundary for two lines of the color difference components continuous in the vertical direction, and orthogonal to two lines of the color difference components.

The filtering decision for the vertical block boundary BB is performed for each partial vertical block boundary.

In the example illustrated in FIG. 3, the filtering decision is performed separately for a partial vertical block boundary b1 for two lines of the line L11 and the line L12, and a partial vertical block boundary b2 for two lines of the line L21 and the line L22.

The filtering decision for the partial vertical block boundary b1 is performed using the line L11 and the line L12 (of the color difference components) in the horizontal direction orthogonal to the partial vertical block boundary b1. Similarly, the filtering decision for the partial vertical block boundary b2 is performed using the line L21 and the line L22 in the horizontal direction orthogonal to the partial vertical block boundary b2.

In the following, a description will be given of filtering decision and filtering performed for the partial vertical block boundary b1.

In the filtering decision, in the adaptation necessity decision, it is decided in order whether or not a condition C91 and a condition C92 below are true.

Condition C91: (bS==2|| bS==1 && (block_width>16 && block_height>16))

Condition C92: d<beta

Note that, in the condition C91, the block_width and the block_height are the horizontal size and the vertical size of a block (for example, CU) over the partial vertical block boundary b1 to be subjected to the filtering decision, as illustrated in FIG. 3. || represents a logical sum operation, and && represents a logical product operation.

Furthermore, the variable beta in the condition C92 is an edge decision threshold value, and the variable beta is given depending on a quantization parameter. Furthermore, the variable d in the condition C92 is calculated by the following equations (1) to (7).

$$dp0=\mathrm{Abs}(p_{2,0}-2*p_{1,0}+p_{0,0}) \tag{1}$$

$$dp1=\mathrm{Abs}(p_{2,1}-2*p_{1,1}+p_{0,1}) \tag{2}$$

$$dq0=\mathrm{Abs}(q_{2,0}-2*q_{1,0}+q_{0,0}) \tag{3}$$

$$dq1=\mathrm{Abs}(q_{2,1}-2*q_{1,1}+q_{0,1}) \tag{4}$$

$$dpq0=dp0+dq0 \tag{5}$$

$$dpq1=dp1+dq1 \tag{6}$$

$$d=dpq0+dpq1 \tag{7}$$

Note that, the condition C92 is similar to a condition used in the filtering decision of the deblocking filter applied to the luminance component in HEVC (hereinafter, referred to as a condition in the luminance component) except that a line referred to is different. In the condition of the luminance component, pixels of the first line and pixels of the fourth line are referred to, and the decision is performed every four lines (segments). In the YUV420 format, the pixel density in each of the horizontal direction and vertical direction of the color difference components (U component and V component) are half the pixel density of the luminance component, so that four lines of the luminance components correspond to two lines of the color difference components. Regarding the condition C92, pixels of the two lines L11 and L12 of the color difference components corresponding to the four lines of the luminance components are referred to, and the decision is performed every two lines.

In a case where at least one of the condition C91 or the condition C92 is false, the deblocking filter is not applied to the color difference components of the decoded image. On the other hand, in a case where both the condition C91 and the condition C92 are true, the filtering strength decision is performed in the filtering decision.

In the filtering strength decision, as a decision of which of the strong filter and the weak filter is applied, it is decided whether or not a condition C93 below is true.

Condition C93: (Block_Width>16 && Block_Height>16)

Note that, the block_width and block_height in the condition C93 are the horizontal size and the vertical size of a block over the partial vertical block boundary b1 to be subjected to the filtering decision, similarly to the block_width and block_height in the condition C91.

In a case where the condition C93 is true, the strong filter is applied to the color difference components of the decoded image at the partial vertical block boundary b1, and in a case where the condition C93 is false, the weak filter is applied to the color difference components of the decoded image at the partial vertical block boundary b1.

The strong filter applied to the color difference component in Non-Patent Document 1 is similar to the strong filter applied to the luminance component in HEVC, and is represented by the following equations (8) to (13).

$$p_0'=\mathrm{Clip3}(p_{0-2}*tc,p_0+2*t_c,(p_2+2*p_1+2*p_0+2*q_0+q_1+4)>>3) \tag{8}$$

$$p_1'=\mathrm{Clip3}(p_1-2*tc,p_1+2*t_c,(p_2+p_1+p_0+q_0+2)>2) \tag{9}$$

$$p_2'=\mathrm{Clip3}(p_2-2*tc,p_2+2*t_c,(2*p_3+3*p_2+p_1+p_0+q_0+4)>>3) \tag{10}$$

$$q_0'=\mathrm{Clip3}(q_0-2*tc,q_0+2*t_c,(p_1+2p_0+2q_0+2q_1+q_2+4)>>3) \tag{11}$$

$$q_1'=\mathrm{Clip3}(q_1-2*tc,q_1+2*t_c,(p_0+q_0+q_1+q_2+2)>>2) \tag{12}$$

$$q_2'=\mathrm{Clip3}(q_2-2*t_c,q_2+2*t_c,(p_0+q_0+q_1+3*q_2+2*q_3+4)>>3) \tag{13}$$

Note that, in the equations (8) to (13), $p_i$ and $q_k$ are pixel values (color difference components) of the pixels of the color difference components (hereinafter, also referred to as color difference pixels) before the application of the deblocking filter. Furthermore, $p_i'$ and $q_k'$ are the color difference components of the color difference pixels after the deblocking filter is applied. Here, the i and k are column indexes in the block Bp and the block Bq described above, respectively, and row indexes are omitted since they are the same in equations (8) to (13). Furthermore, the $t_c$ is a parameter given depending on the quantization parameter. Furthermore, the Clip3 (a, b, c) represents a clipping process in which the value c is clipped in a range of a≤c≤b.

The weak filter applied to the color difference components in Non-Patent Document 1 is the same as the weak filter applied to the color difference components in HEVC.

In the above, the process has been described related to the deblocking filter that can be applied to the color difference components of the decoded image in Non-Patent Document 1. According to the method described above, the strong filter is applied not only to the luminance component but also to the color difference components depending on the conditions.

<Color Format>

FIG. 4 is a diagram illustrating an example of a color format (chroma format) of an image.

Examples of the color format of the image to be encoded include the YUV420 format, the YUV422 format, the YUV444 format, and the like. Note that, the color format of the image to be encoded is not limited to these.

In the YUV420 format, the densities in the horizontal direction and the vertical direction of (the pixels of) the color difference components (chroma) are down-sampled to ½ of the densities in the horizontal direction and the vertical direction of (the pixels of) the luminance component (luminance), respectively. In the YUV422 format, the density in the vertical direction of the color difference component is the same as the density in the vertical direction of the luminance component, but the density in the horizontal direction of the color difference component is down-sampled to ½ of the density in the horizontal direction of the luminance component. In the YUV444 format, the densities in the horizontal direction and the vertical direction of the color difference components are the same as the densities in the horizontal direction and the vertical direction of the luminance component, respectively.

Note that, in FIG. 5, the arrows indicate the scanning order of the luminance component and the color difference component.

In the reference document REF4, regarding images in the YUV420 format, the YUV422 format, and the YUV444 format, it has been devised to perform the filtering decision using two lines, the first line and the fourth line, of the four lines (segments) for the luminance component, and perform the filtering decision using two lines, the first line and the second line, of the two lines (segments) or the four lines (segments) for the color difference component.

Here, since the density of the color difference component in the vertical direction in the YUV422 format is the same as the density of the luminance component in the vertical direction, the filtering decision for the color difference component at the vertical block boundary (block boundary in the vertical direction) is performed in units of four lines similarly to the filtering decision for the luminance component. The same applies to the color difference component in the horizontal direction and the vertical direction in the YUV444 format.

On the other hand, since the density of the color difference component in the horizontal direction in the YUV422 format is ½ of the density of the luminance component in the horizontal direction, the filtering decision for the color difference component at the horizontal block boundary (block boundary in the horizontal direction) is performed in units of two lines that is ½ of the units of four lines of the filtering decision. The same applies to the color difference component in the horizontal direction and the vertical direction in the YUV420 format.

Thus, in the reference document REF4, for the YUV420 format, although the densities of the color difference component in the horizontal direction and the vertical direction are ½ of the densities of the luminance component in the horizontal direction and the vertical direction, respectively, the filtering decision for the color difference component in the vertical direction is performed using two lines similarly to the filtering decision for the luminance component in the horizontal direction and the vertical direction. For this reason, there is a possibility that a difference occurs in accuracy between the filtering decision for the color difference component and the filtering decision for the luminance component, and the image quality degrades. The same applies to the color difference component and the luminance component in the horizontal direction in the YUV422 format.

To make the accuracy of the filtering decision for the color difference component and the filtering decision for the luminance component about the same, for the horizontal direction and the vertical direction in the YUV420 format and the horizontal direction in the YUV422 format, it is desirable to use one line out of the two lines for the filtering decision for the color difference component in correspondence with the use of the two lines out of the four lines for the filtering decision for the luminance component.

Furthermore, although the density of the color difference component in the vertical direction in the YUV422 format is the same as the density of the luminance component in the vertical direction, the filtering decision for the luminance component in the vertical direction is performed using two lines, the first line and the fourth line, of the four lines, whereas the filtering decision for the color difference component in the vertical direction is performed using the two lines different from the case of the luminance component of the four lines, that is, the two lines, the first line and the second line. For this reason, there is a possibility that a difference occurs in accuracy between the filtering decision for the color difference component and the filtering decision for the luminance component, and the image quality degrades. The same applies to the color difference component and the luminance component in the horizontal direction and the vertical direction in the YUV444 format.

To make the accuracy of the filtering decision for the color difference component and the filtering decision for the luminance component about the same, for the vertical direction in the YUV422 format and the horizontal direction and the vertical direction of the YUV444 format, it is desirable to use the first line and the fourth line out of the four lines for the filtering decision for the color difference component in correspondence with the use of the first line and the fourth line out of the four lines for the filtering decision for the luminance component.

Thus, in the present technology, the number of reference lines to be referred to in Deblocking filter decision is changed depending on the color format (YUV420/422/444). That is, in the present technology, the number of reference lines used for the filtering decision of the color difference component is set depending on the color format.

For example, in a case where the color format is the YUV420 format, down-sampling is performed in the horizontal direction and the vertical direction, so that one line is set as the reference line for both the horizontal and vertical block boundaries. For example, in a case where the color format is YUV422 format, down-sampling is performed in the horizontal direction, so that one line is set as the reference line at the block boundary in the horizontal direction, and two lines (Luma (luminance component) are set as the reference lines at the block boundary in the vertical direction. For example, in a case where the color format is YUV444 format, two lines (same as Luma) are set as the reference lines for both the horizontal and vertical block boundaries.

Moreover, in the present technology, by matching the line (reference line) used for the filtering decision for the color difference component with the line used for the filtering decision for the luminance component, correspondence is made between the line used for the filtering decision for the color difference component and the line used for the filtering decision for the luminance component, whereby the processes of the luminance component and the color difference component are unified.

FIGS. 5 and 6 are diagrams explaining an overview of the present technology.

FIG. 5 is a diagram explaining filtering decision (hereinafter, also referred to as vertical block boundary filtering decision) for a deblocking filter applied to (pixels in the horizontal direction orthogonal to) a vertical block boundary.

A of FIG. 5 illustrates luminance components and color difference components in the YUV420 format. B of FIG. 5B illustrates luminance components and color difference components in the YUV422 format. C of FIG. 5 illustrates luminance components and color difference components in the YUV444 format.

In the present technology, for the luminance component, for example, in any color format of the YUV420 format, the YUV422 format, and the YUV444 format, as devised in the reference document REF4, with a vertical block boundary for four lines in the horizontal direction as a partial vertical block boundary, the vertical block boundary filtering decision is performed using two lines, a first line D1 and a fourth line D4, of the four lines in the horizontal direction orthogonal to the partial vertical block boundary, for each partial vertical block boundary.

Furthermore, in the present technology, for the color difference component in the YUV420 format, the density in the vertical direction is ½ of that of the luminance component, so that the vertical block boundary filtering decision is performed using only a first line D11 out of two lines in the horizontal direction of the color difference component corresponding to the four lines in the horizontal direction of the luminance component.

Moreover, in the present technology, for the color difference component of the YUV422 format or the YUV444 format, the density in the vertical direction is the same as that of the luminance component, so that the vertical block boundary filtering decision is performed using two lines, a first line D21 and a fourth line D24, or a first line D31 and a fourth line D34, of the four lines in the horizontal direction of the color difference component corresponding to the four lines in the horizontal direction of the color difference component, similarly to the luminance component.

FIG. 6 is a diagram explaining filtering decision (hereinafter, also referred to as horizontal block boundary filtering decision) for a deblocking filter applied to (pixels in the vertical direction orthogonal to) a horizontal block boundary.

A of FIG. 6 illustrates luminance components and color difference components in the YUV420 format. B of FIG. 6 illustrates luminance components and color difference components in the YUV422 format. C of FIG. 6 illustrates luminance components and color difference components in the YUV444 format.

In the present technology, for the luminance component, in any color format of the YUV420 format, the YUV422 format, and the YUV444 format, as devised in the reference document REF4, with a horizontal block boundary for four lines in the vertical direction as a partial horizontal block boundary, the horizontal block boundary filtering decision is performed using two lines, a first line D51 and a fourth line D54, of the four lines in the vertical direction orthogonal to the partial horizontal block boundary, for each partial horizontal block boundary.

The partial horizontal block boundary is a unit of processing when it is decided whether or not the deblocking filter is applied (the pixels in the vertical direction orthogonal to) the horizontal block boundary, similarly to the partial vertical block boundary.

Furthermore, in the present technology, for the color difference component in the YUV420 format or the YUV422, the density in the horizontal direction is ½ of that of the luminance component, so that the horizontal block boundary filtering decision is performed using only a first line D61 or D71 of the two lines in the vertical direction of the color difference component corresponding to the four lines in the vertical direction of the luminance component.

Moreover, in the present technology, for the color difference component in the YUV444 format, the density in the horizontal direction is the same as that of the luminance component, so that the horizontal block boundary filtering decision is performed using two lines, a first line D81 and a fourth line D84, of the four lines in the vertical direction of the color difference component corresponding to the four lines in the vertical direction of the luminance component, similarly to the luminance component.

<Image Processing System to which the Present Technology is Applied>

Figure 7:
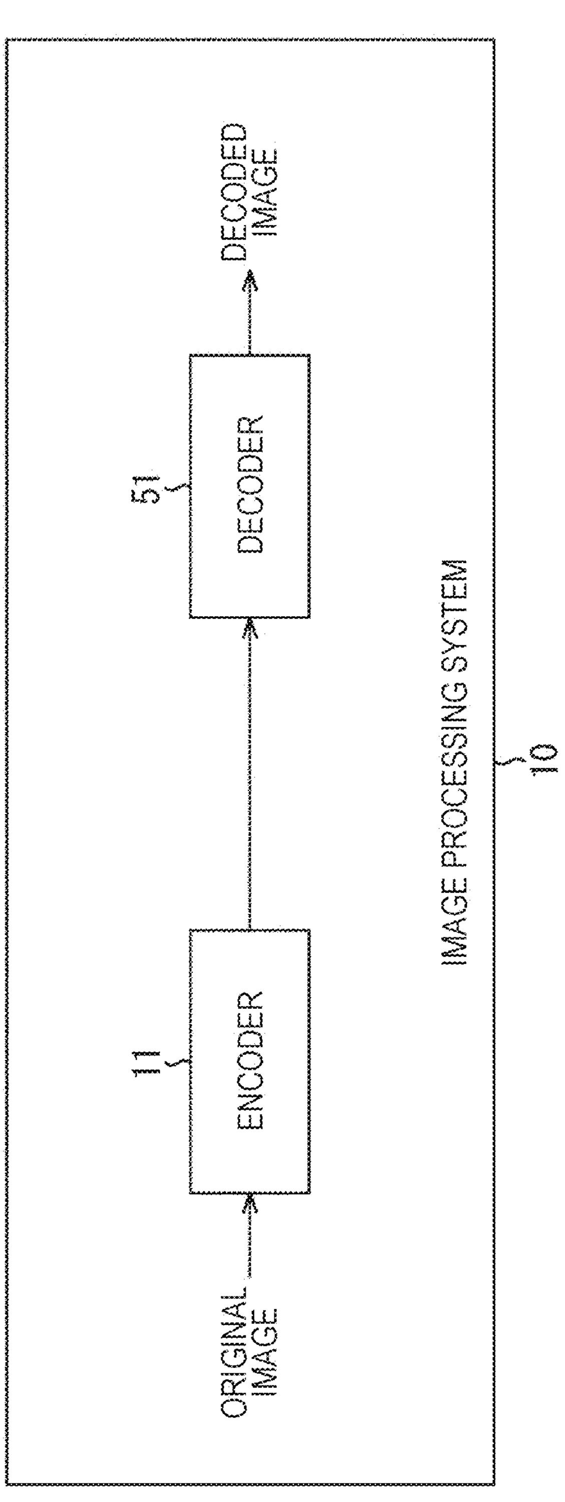
FIG. 7 is a block diagram illustrating a configuration example of an embodiment of an image processing system to which the present technology is applied.

FIG. 7 is a block diagram illustrating a configuration example of an embodiment of an image processing system to which the present technology is applied.

An image processing system 10 includes an image processing device as an encoder 11, and an image processing device as a decoder 51.

The encoder 11 encodes an original image to be encoded supplied to the encoder 11 and outputs an encoded bitstream obtained by the encoding. The encoded bitstream is supplied to the decoder 51 via a recording medium or a transmission medium (not illustrated).

The decoder 51 decodes the encoded bitstream supplied to the decoder 51 and outputs a decoded image obtained by the decoding.

<Configuration Example of Encoder 11>

Figure 8:
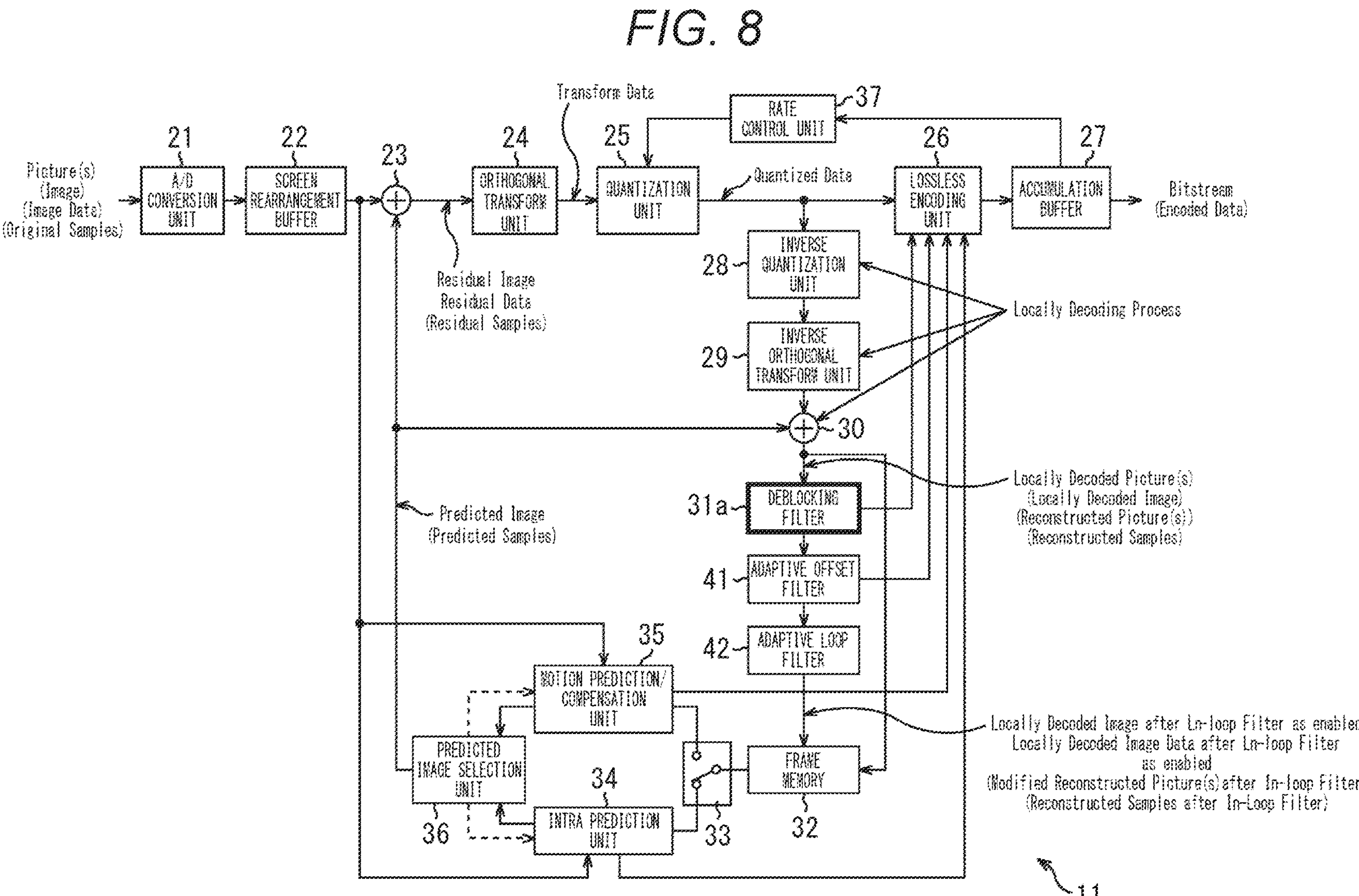
FIG. 8 is a block diagram illustrating a detailed configuration example of an encoder 11.

FIG. 8 is a block diagram illustrating a detailed configuration example of the encoder 11 of FIG. 7.

Note that, in the block diagram described below, lines for supplying information (data) necessary for a process for each block are omitted as appropriate to avoid complicating the drawing.

In FIG. 8, the encoder 11 includes an A/D conversion unit 21, a screen rearrangement buffer 22, a calculation unit 23, an orthogonal transform unit 24, a quantization unit 25, a lossless encoding unit 26, and an accumulation buffer 27. Moreover, the encoder 11 includes an inverse quantization unit 28, an inverse orthogonal transform unit 29, a calculation unit 30, a frame memory 32, a selection unit 33, an intra prediction unit 34, a motion prediction/compensation unit 35, a predicted image selection unit 36, and a rate control unit 37. Furthermore, the encoder 11 includes a deblocking filter 31*a*, an adaptive offset filter 41, and an adaptive loop filter (ALF) 42.

The A/D conversion unit 21 performs A/D conversion of an original image of an analog signal (encoding target) into an original image of a digital signal, and supplies the original image to the screen rearrangement buffer 22 for storage. Note that, in a case where the original image of the digital signal is supplied to the encoder 11, the encoder 11 can be configured without being provided with the A/D conversion unit 21.

The screen rearrangement buffer 22 rearranges frames of the original image into the encoding (decoding) order from the display order depending on a Group Of Picture (GOP), and supplies the frames to the calculation unit 23, the intra prediction unit 34, and the motion prediction/compensation unit 35.

The calculation unit 23 subtracts a predicted image supplied from the intra prediction unit 34 or the motion prediction/compensation unit 35 via the predicted image selection unit 36 from the original image from the screen rearrangement buffer 22, and supplies a residual (prediction residual) obtained by the subtraction to the orthogonal transform unit 24.

The orthogonal transform unit 24 performs an orthogonal transform such as a discrete cosine transform or a Karhunen-Loeve transform on the residual supplied from the calculation unit 23, and supplies orthogonal transform coefficients obtained by the orthogonal exchange to the quantization unit 25.

The quantization unit 25 quantizes the orthogonal transform coefficients supplied from the orthogonal transform unit 24. The quantization unit 25 sets a quantization parameter on the basis of a target value of the code amount (code amount target value) supplied from the rate control unit 37, and quantizes the orthogonal transform coefficients. The quantization unit 25 supplies coded data that is the quantized orthogonal transform coefficients to the lossless encoding unit 26.

The lossless encoding unit 26 encodes the quantized orthogonal transform coefficients as coded data from the quantization unit 25 with a predetermined lossless encoding method.

Furthermore, the lossless encoding unit 26 acquires, from each block, encoding information necessary for decoding by the decoding device 170 out of encoding information regarding predictive encoding by the encoder 11.

Here, the encoding information includes, for example, a prediction mode of intra prediction or inter-prediction, motion information such as a motion vector, the code amount target value, the quantization parameter, a picture type (I, P, B), filter parameters of the deblocking filter 31*a* and the adaptive offset filter 41, and the like.

The prediction mode can be acquired from the intra prediction unit 34 or the motion prediction/compensation unit 35. The motion information can be acquired from the motion prediction/compensation unit 35. The filter parameters of the deblocking filter 31*a* and the adaptive offset filter 41 can be acquired from the deblocking filter 31*a* and the adaptive offset filter 41, respectively.

The lossless encoding unit 26 encodes the encoding information with a lossless encoding method, for example, variable-length encoding or arithmetic encoding such as Context-Adaptive Variable Length Coding (CAVLC) or Context-Adaptive Binary Arithmetic Coding (CABAC), or others, generates a (multiplexed) encoded bitstream including the encoding information after encoding, and the coded data from the quantization unit 25, and supplies the encoded bitstream to the accumulation buffer 27.

The accumulation buffer 27 temporarily stores the encoded bitstream supplied from the lossless encoding unit 26. The encoded bitstream accumulated in the accumulation buffer 27 is read and transmitted at a predetermined timing.

The coded data that is the orthogonal transform coefficients quantized by the quantization unit 25 is supplied to the lossless encoding unit 26 and also to the inverse quantization unit 28. The inverse quantization unit 28 performs inverse quantization on the quantized orthogonal transform coefficients with a method corresponding to the quantization by the quantization unit 25, and supplies the orthogonal transform coefficients obtained by the inverse quantization to the inverse orthogonal transform unit 29.

The inverse orthogonal transform unit 29 performs inverse orthogonal transform on the orthogonal transform coefficients supplied from the inverse quantization unit 28 with a method corresponding to an orthogonal transform process performed by the orthogonal transform unit 24, and supplies a residual obtained as a result of the inverse orthogonal transform to the calculation unit 30.

The calculation unit 30 adds the predicted image supplied from the intra prediction unit 34 or the motion prediction/compensation unit 35 via the predicted image selection unit 36 to the residual supplied from the inverse orthogonal transform unit 29, and therefore obtains and outputs (a part of) a decoded image obtained by decoding the original image.

The decoded image output by the calculation unit 30 is supplied to the deblocking filter 31*a* or the frame memory 32.

The frame memory 32 temporarily stores the decoded image supplied from the calculation unit 30, and a decoded image (filter image) to which the deblocking filter 31*a*, the adaptive offset filter 41, and the ALF 42 are applied, supplied from the ALF 42. The decoded image stored in the frame memory 32 is supplied to the selection unit 33 at a necessary timing, as a reference image used for generating the predicted image.

The selection unit 33 selects a supply destination of the reference image supplied from the frame memory 32. In a case where the intra prediction is performed in the intra prediction unit 34, the selection unit 33 supplies the reference image supplied from the frame memory 32 to the intra prediction unit 34. In a case where inter-prediction is performed in the motion prediction/compensation unit 35, the selection unit 33 supplies the reference image supplied from the frame memory 32 to the motion prediction/compensation unit 35.

The intra prediction unit 34 performs intra prediction (in-screen prediction) using the original image supplied from the screen rearrangement buffer 22 and the reference image supplied from the frame memory 32 via the selection unit 33. The intra prediction unit 34 selects an optimal intra prediction mode on the basis of a predetermined cost function (for example, RD cost, or the like), and supplies a predicted image generated from the reference image in the optimal intra prediction mode to the predicted image selection unit 36. Furthermore, as described above, the intra prediction unit 34 appropriately supplies the prediction mode indicating the intra prediction mode selected on the basis of the cost function to the lossless encoding unit 26 and the like.

The motion prediction/compensation unit 35 performs motion prediction (inter-prediction) using the original image supplied from the screen rearrangement buffer 22, and the reference image supplied from the frame memory 32 via the selection unit 33. Moreover, the motion prediction/compensation unit 35 performs motion compensation depending on the motion vector detected by the motion prediction, to generate the predicted image. The motion prediction/compensation unit 35 performs inter-prediction in a plurality of inter-prediction modes prepared in advance, to generate a predicted image from the reference image.

The motion prediction/compensation unit 35 selects an optimal inter-prediction mode on the basis of a predetermined cost function of the predicted image obtained for each of the plurality of inter-prediction modes. Moreover, the motion prediction/compensation unit 35 supplies the predicted image generated in the optimal inter-prediction mode to the predicted image selection unit 36.

Furthermore, the motion prediction/compensation unit 35 supplies, to the lossless encoding unit 26, a prediction mode indicating the inter-prediction mode selected on the basis of the cost function, and motion information such as a motion vector required in decoding of the coded data encoded in the inter-prediction mode, and the like.

The predicted image selection unit 36 selects a supply source of the predicted image to be supplied to the calculation units 23 and 30 from the intra prediction unit 34 and the motion prediction/compensation unit 35, and supplies the predicted image supplied from the selected supply source to the calculation units 23 and 30.

The rate control unit 37 controls a rate of quantization operation in the quantization unit 25 on the basis of the code amount of the encoded bitstream accumulated in the accumulation buffer 27 so that overflow or underflow does not occur. That is, the rate control unit 37 sets a target code amount of the encoded bitstream not to cause overflow and underflow of the accumulation buffer 27, and supplies the target code amount to the quantization unit 25.

The deblocking filter 31*a* applies the deblocking filter to the decoded image from the calculation unit 30 as necessary, and supplies, to the adaptive offset filter 41, the decoded image (filter image) to which the deblocking filter is applied, or the decoded image to which the deblocking filter is not applied.

The adaptive offset filter 41 applies the adaptive offset filter to the decoded image from the deblocking filter 31*a* as necessary, and supplies, to the ALF 42, the decoded image (filter image) to which the adaptive offset filter is applied, or the decoded image to which the adaptive offset filter is not applied.

The ALF 42 applies ALF to the decoded image from the adaptive offset filter 41 as necessary, and supplies, to the frame memory 32, the decoded image to which the ALF is applied or the decoded image to which the ALF is not applied.

<Encoding Process>

Figure 9:
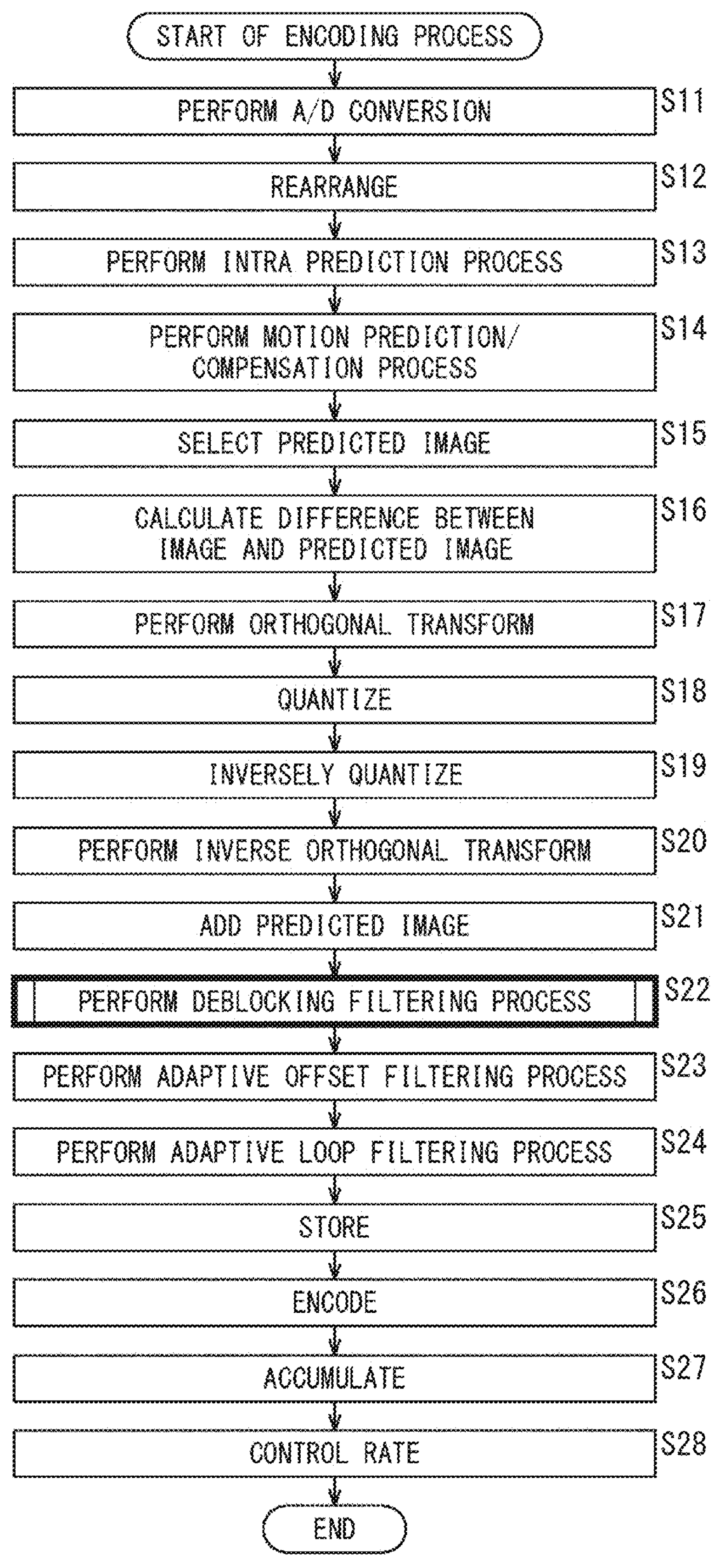
FIG. 9 is a flowchart explaining an example of an encoding process by the encoder 11.

FIG. 9 is a flowchart explaining an example of an encoding process by the encoder 11 in FIG. 8.

Note that, the order of the steps of the encoding process illustrated in FIG. 9 is an order for convenience of description, and the steps of the actual encoding process are appropriately performed in parallel and in a necessary order. The same applies to processes described later.

In the encoder 11, in step S11, the A/D conversion unit 21 performs A/D conversion on the original image and supplies the converted original image to the screen rearrangement buffer 22, and the process proceeds to step S12.

In step S12, the screen rearrangement buffer 22 stores the original image from the A/D conversion unit 21 and performs rearrangement in the encoding order to output the original image, and the process proceeds to step S13.

In step S13, the intra prediction unit 34 performs an intra prediction process in the intra prediction mode, and the process proceeds to step S14. In step S14, the motion prediction/compensation unit 35 performs inter-motion prediction process of performing motion prediction and motion compensation in the inter-prediction mode, and the process proceeds to step S15.

In the intra prediction process by the intra prediction unit 34 and the inter-motion prediction process by the motion prediction/compensation unit 35, cost functions of various prediction modes are calculated, and a predicted image is generated.

In step S15, the predicted image selection unit 36 determines an optimal prediction mode on the basis of each cost function obtained by the intra prediction unit 34 and the motion prediction/compensation unit 35. Then, the predicted image selection unit 36 selects and outputs a predicted image in the optimal prediction mode from the predicted image generated by the intra prediction unit 34 and the predicted image generated by the motion prediction/compensation unit 35, and the process proceeds from step S15 to step S16.

In step S16, the calculation unit 23 calculates a residual between a target image to be encoded that is the original image output from the screen rearrangement buffer 22, and the predicted image output from the predicted image selection unit 36, and supplies the residual to the orthogonal transform unit 24, and the process proceeds to step S17.

In step S17, the orthogonal transform unit 24 performs orthogonal transform on the residual from the calculation unit 23, and supplies orthogonal transform coefficients obtained as a result of the orthogonal transform, to the quantization unit 25, and the process proceeds to step S18.

In step S18, the quantization unit 25 quantizes the orthogonal transform coefficients from the orthogonal transform unit 24, and supplies quantization coefficients obtained by the quantization to the lossless encoding unit 26 and the inverse quantization unit 28, and the process proceeds to step S19.

In step S19, the inverse quantization unit 28 performs inverse quantization on the quantization coefficients from the quantization unit 25, and supplies orthogonal transform coefficients obtained as a result of the inverse quantization, to the inverse orthogonal transform unit 29, and the process proceeds to step S20. In step S20, the inverse orthogonal transform unit 29 performs inverse orthogonal transform on the orthogonal transform coefficients from the inverse quantization unit 28, and supplies a residual obtained as a result of the inverse orthogonal transform, to the calculation unit 30, and the process proceeds to step S21.

In step S21, the calculation unit 30 adds the residual from the inverse orthogonal transform unit 29 and the predicted image output from the predicted image selection unit 36 together, to generate a decoded image corresponding to the original image subjected to residual calculation in the calculation unit 23. The calculation unit 30 supplies the decoded image to the deblocking filter 31*a*, and the process proceeds from step S21 to step S22.

In step S22, the deblocking filter 31*a* applies the deblocking filter to the decoded image from the calculation unit 30, supplies a filter image obtained as a result of the application, to the adaptive offset filter 41, and the process proceeds to step S23.

In step S23, the adaptive offset filter 41 applies the adaptive offset filter to the filter image from the deblocking filter 31*a*, supplies a filter image obtained as a result of the application, to the ALF 42, and the process proceeds to step S24.

In step S24, the ALF 42 applies the ALF to the filter image from the adaptive offset filter 41, supplies a filter image obtained as a result of the application, to the frame memory 32, and the process proceeds to step S25.

In step S25, the frame memory 32 stores the filter image supplied from the ALF 42, and the process proceeds to step S26. The filter image stored in the frame memory 32 is used as a reference image that is a source for generating the predicted image, in steps S13 and S14.

In step S26, the lossless encoding unit 26 encodes the coded data that is the quantization coefficients from the quantization unit 25, and generates an encoded bitstream including the coded data. Moreover, the lossless encoding unit 26 encodes encoding information as necessary, such as the quantization parameter used for quantization in the quantization unit 25, the prediction mode obtained in the intra prediction process in the intra prediction unit 34, the prediction mode and motion information obtained in the inter-motion prediction process in the motion prediction/compensation unit 35, and the filter parameters of the deblocking filter 31*a* and the adaptive offset filter 41, and includes the encoding information in the encoded bitstream.

Then, the lossless encoding unit 26 supplies the encoded bitstream to the accumulation buffer 27, and the process proceeds from step S26 to step S27.

In step S27, the accumulation buffer 27 accumulates the encoded bitstream from the lossless encoding unit 26, and the process proceeds to step S28. The encoded bitstream accumulated in the accumulation buffer 27 is appropriately read and transmitted.

In step S28, the rate control unit 37 controls the rate of the quantization operation in the quantization unit 25 on the basis of the code amount (generated code amount) of the encoded bitstream accumulated in the accumulation buffer 27 so that overflow or underflow does not occur, and the encoding process ends.

<Configuration Example of Decoder 51>

Figure 10:
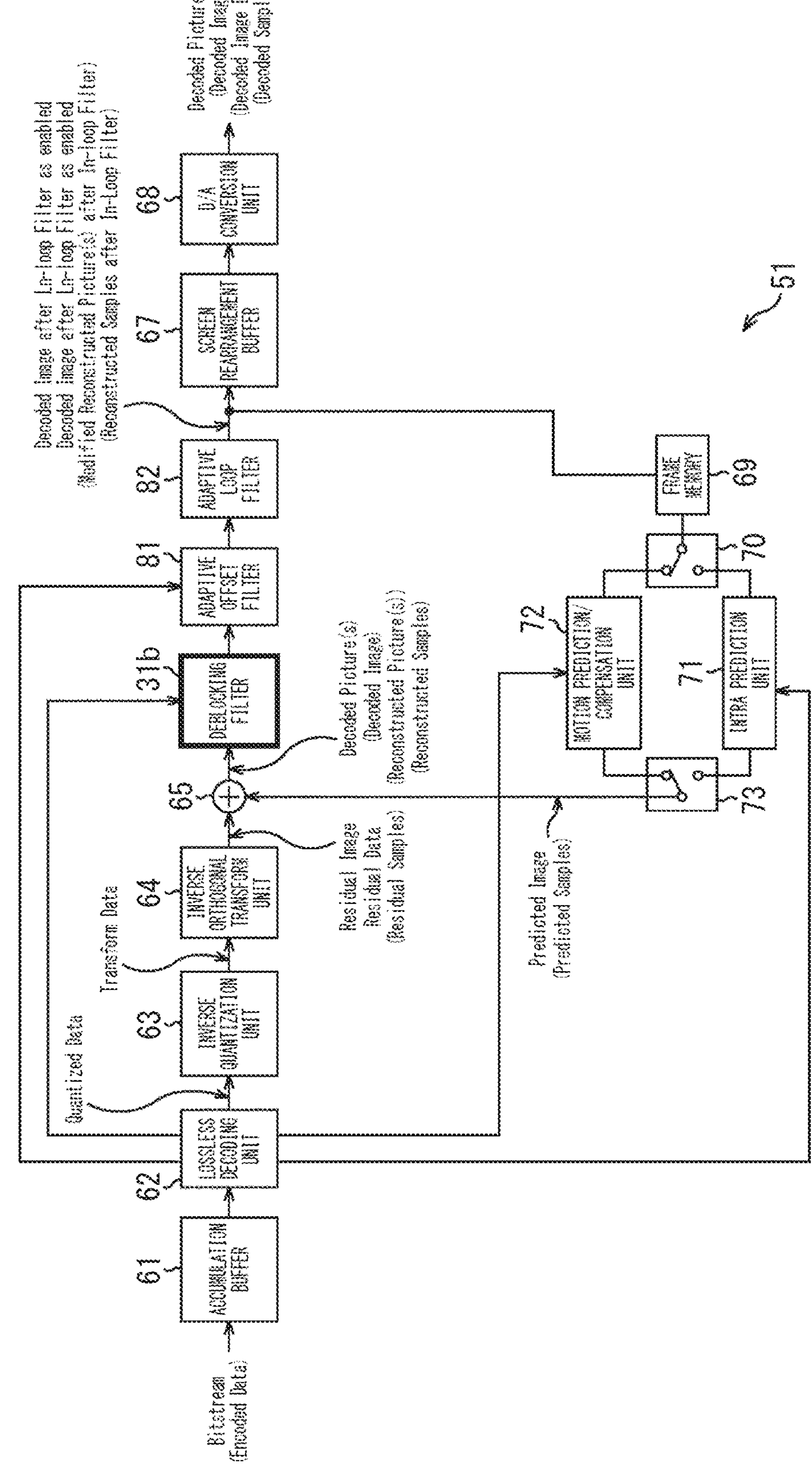
FIG. 10 is a block diagram illustrating a detailed configuration example of a decoder 51.

FIG. 10 is a block diagram illustrating a detailed configuration example of the decoder 51 of FIG. 7.

In FIG. 10, the decoder 51 includes an accumulation buffer 61, a lossless decoding unit 62, an inverse quantization unit 63, an inverse orthogonal transform unit 64, a calculation unit 65, a screen rearrangement buffer 67, and a D/A conversion unit 68. Moreover, the decoder 51 includes a frame memory 69, a selection unit 70, an intra prediction unit 71, a motion prediction/compensation unit 72, and a selection unit 73. Furthermore, the decoder 51 includes a deblocking filter 31*b*, an adaptive offset filter 81, and an ALF 82.

The accumulation buffer 61 temporarily accumulates an encoded bitstream transmitted from the encoder 11, and supplies the encoded bitstream to the lossless decoding unit 62 at a predetermined timing.

The lossless decoding unit 62 receives the encoded bitstream from the accumulation buffer 61, and decodes the encoded bitstream with a method corresponding to the encoding method of the lossless encoding unit 26 in FIG. 8.

Then, the lossless decoding unit 62 supplies quantization coefficients as coded data included in a decoding result of the encoded bitstream to the inverse quantization unit 63.

Furthermore, the lossless decoding unit 62 has a function of performing parsing. The lossless decoding unit 62 parses the necessary encoding information included in the decoding result of the encoded bitstream, and supplies the encoding information to the intra prediction unit 71, the motion prediction/compensation unit 72, the deblocking filter 31*b*, the adaptive offset filter 81, and other necessary blocks.

The inverse quantization unit 63 performs inverse quantization on the quantization coefficients as the coded data from the lossless decoding unit 62 with a method corresponding to the quantization method of the quantization unit 25 in FIG. 8, and supplies orthogonal transform coefficients obtained by the inverse quantization to the inverse orthogonal transform unit 64.

The inverse orthogonal transform unit 64 performs inverse orthogonal transform on the orthogonal transform coefficients supplied from the inverse quantization unit 63 with a method corresponding to the orthogonal transform method of the orthogonal transform unit 24 in FIG. 8, and supplies a residual obtained as a result of the inverse orthogonal transform, to the calculation unit 65.

To the calculation unit 65, the residual is supplied from the inverse orthogonal transform unit 64, and also a predicted image is supplied from the intra prediction unit 71 or the motion prediction/compensation unit 72 via the selection unit 73.

The calculation unit 65 adds the residual from the inverse orthogonal transform unit 64 and the predicted image from the selection unit 73 together, to generate a decoded image, and supplies the decoded image to the deblocking filter 31*b*.

The screen rearrangement buffer 67 temporarily stores the decoded image supplied from the ALF 82, rearranges frames (pictures) of the decoded image into the display order from the encoding (decoding) order, and supplies the frames to the D/A conversion unit 68.

The D/A conversion unit 68 performs D/A conversion on the decoded image supplied from the screen rearrangement buffer 67, and outputs the converted decoded image to a display (not illustrated) for display. Note that, in a case where a device connected to the decoder 51 accepts an image of a digital signal, the decoder 51 can be configured without being provided with the D/A conversion unit 68.

The frame memory 69 temporarily stores the decoded image supplied from the ALF 82. Moreover, the frame memory 69 supplies, to the selection unit 70, the decoded image as a reference image to be used for generating the predicted image, at a predetermined timing or on the basis of an external request from the intra prediction unit 71, the motion prediction/compensation unit 72, or the like.

The selection unit 70 selects a supply destination of the reference image supplied from the frame memory 69. In a case where an image encoded in the intra prediction is decoded, the selection unit 70 supplies the reference image supplied from the frame memory 69 to the intra prediction unit 71. Furthermore, in a case where an image encoded in the inter-prediction is decoded, the selection unit 70 supplies the reference image supplied from the frame memory 69 to the motion prediction/compensation unit 72.

In accordance with the prediction mode included in the encoding information supplied from the lossless decoding unit 62, in the intra prediction mode used in the intra prediction unit 34 in FIG. 8, the intra prediction unit 71 performs intra prediction by using the reference image supplied via the selection unit 70 from the frame memory 69. Then, the intra prediction unit 71 supplies the predicted image obtained by the intra prediction to the selection unit 73.

In accordance with the prediction mode included in the encoding information supplied from the lossless decoding unit 62, in the inter-prediction mode used in the motion prediction/compensation unit 35 in FIG. 8, the motion prediction/compensation unit 72 performs inter-prediction by using the reference image supplied via the selection unit 70 from the frame memory 69. The inter-prediction is performed using the motion information and the like included in the encoding information supplied from the lossless decoding unit 62, as necessary.

The motion prediction/compensation unit 72 supplies the predicted image obtained by the inter-prediction to the selection unit 73.

The selection unit 73 selects the predicted image supplied from the intra prediction unit 71 or the predicted image supplied from the motion prediction/compensation unit 72, and supplies the selected predicted image to the calculation unit 65.

The deblocking filter 31*b* applies the deblocking filter to the decoded image from the calculation unit 65 in accordance with the filter parameters included in the encoding information supplied from the lossless decoding unit 62, and supplies, to the adaptive offset filter 81, the decoded image (filter image) to which the deblocking filter is applied, or the decoded image to which the deblocking filter is not applied.

The adaptive offset filter 81 applies the adaptive offset filter to the decoded image from the deblocking filter 31*b* as necessary in accordance with the filter parameters included in the encoding information supplied from the lossless decoding unit 62, and supplies, to the ALF 82, the decoded image (filter image) to which the adaptive offset filter is applied, or the decoded image to which the adaptive offset filter is not applied.

The ALF 82 applies the ALF to the decoded image from the adaptive offset filter 81 as necessary, and supplies the decoded image to which the ALF is applied or the decoded image to which the ALF is not applied, to the screen rearrangement buffer 67 and the frame memory 69.

<Decoding Process>

Figure 11:
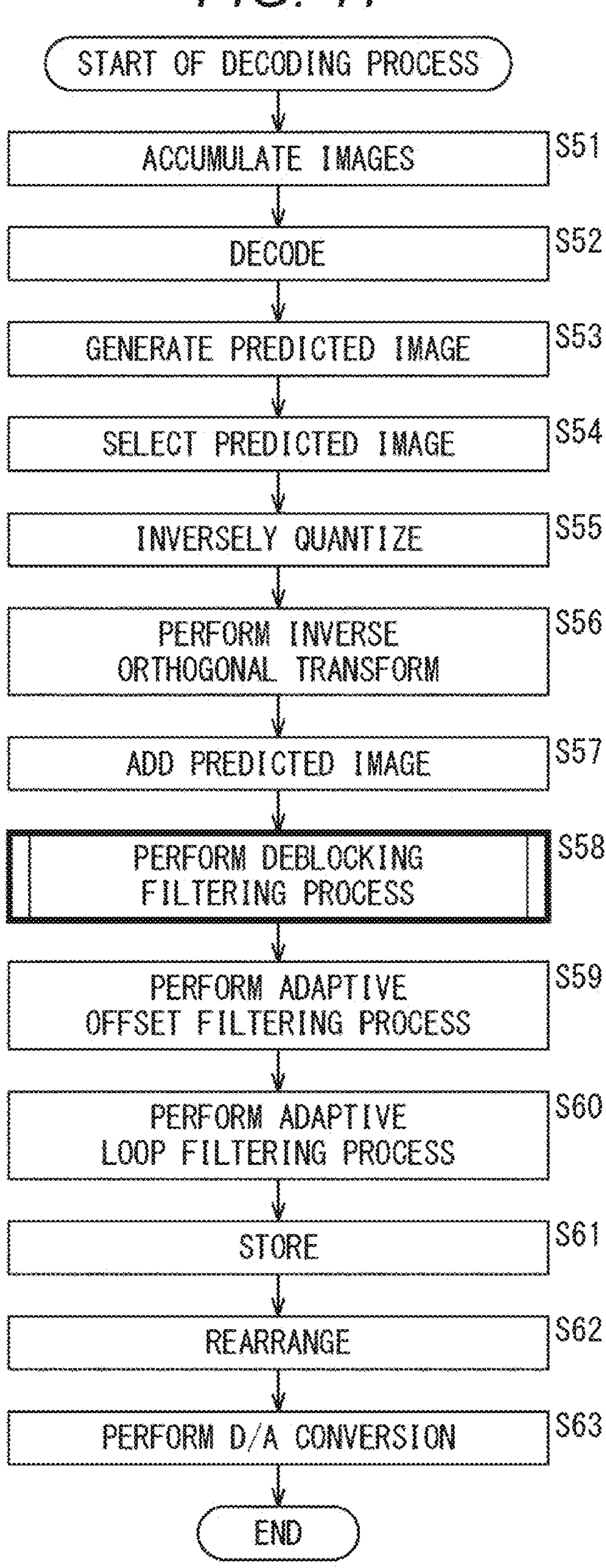
FIG. 11 is a flowchart explaining an example of a decoding process by the decoder 51.

FIG. 11 is a flowchart explaining an example of a decoding process by the decoder 51 of FIG. 10.

In the decoding process, in step S51, the accumulation buffer 61 temporarily accumulates an encoded bitstream transmitted from the encoder 11, and appropriately supplies the encoded bitstream to the lossless decoding unit 62, and the process proceeds to step S52.

In step S52, the lossless decoding unit 62 receives and decodes the encoded bitstream supplied from the accumulation buffer 61, and supplies the quantization coefficients as the coded data included in the decoding result of the encoded bitstream to the inverse quantization unit 63.

Furthermore, the lossless decoding unit 62 parses the encoding information included in the decoding result of the encoded bitstream. Then, the lossless decoding unit 62 supplies the necessary encoding information to the intra prediction unit 71, the motion prediction/compensation unit 72, the deblocking filter 31*b*, the adaptive offset filter 81, and other necessary blocks.

Then, the process proceeds from step S52 to step S53, and the intra prediction unit 71 or the motion prediction/compensation unit 72 performs intra prediction process or inter-motion prediction process of generating a predicted image, in accordance with the reference image supplied via the selection unit 70 from the frame memory 69, and the encoding information supplied from the lossless decoding unit 62. Then, the intra prediction unit 71 or the motion prediction/compensation unit 72 supplies the predicted image obtained by the intra prediction process or the inter-motion prediction process to the selection unit 73, and the process proceeds from step S53 to step S54.

In step S54, the selection unit 73 selects the predicted image supplied from the intra prediction unit 71 or the motion prediction/compensation unit 72, and supplies the predicted image to the calculation unit 65, and the process proceeds to step S55.

In step S55, the inverse quantization unit 63 performs inverse quantization on the quantization coefficients from the lossless decoding unit 62, and supplies orthogonal transform coefficients obtained as a result of the inverse quantization, to the inverse orthogonal transform unit 64, and the process proceeds to step S56.

In step S56, the inverse orthogonal transform unit 64 performs inverse orthogonal transform on the orthogonal transform coefficients from the inverse quantization unit 63, and supplies a residual obtained as a result of the inverse orthogonal transform, to the calculation unit 65, and the process proceeds to step S57.

In step S57, the calculation unit 65 generates a decoded image by adding the residual from the inverse orthogonal transform unit 64 and the predicted image from the selection unit 73 together. Then, the calculation unit 65 supplies the decoded image to the deblocking filter 31*b*, and the process proceeds from step S57 to step S58.

In step S58, the deblocking filter 31*b* applies the deblocking filter to the decoded image from the calculation unit 65 in accordance with the filter parameters included in the encoding information supplied from the lossless decoding unit 62, and supplies a filter image obtained as a result of the application, to the adaptive offset filter 81, and the process proceeds to step S59.

In step S59, the adaptive offset filter 81 applies the adaptive offset filter to the filter image from the deblocking filter 31*b* in accordance with the filter parameters included in the encoding information supplied from the lossless decoding unit 62, and supplies a filter image obtained as a result of the application, to the ALF 82, and the process proceeds to step S60.

The ALF 82 applies the ALF to the filter image from the adaptive offset filter 81, and supplies the filter image obtained as a result of the application, to the screen rearrangement buffer 67 and the frame memory 69, and the process proceeds to step S61.

In step S61, the frame memory 69 temporarily stores the filter image supplied from the ALF 82, and the process proceeds to step S62. The filter image (decoded image) stored in the frame memory 69 is used as a reference image that is a source for generating the predicted image, in the intra prediction process or the inter-motion prediction process in step S53.

In step S62, the screen rearrangement buffer 67 performs rearrangement of the filter image supplied from the ALF 82 in the display order, and supplies the filter image to the D/A conversion unit 68, and the process proceeds to step S63.

In step S63, the D/A conversion unit 68 performs D/A conversion on the filter image from the screen rearrangement buffer 67, and the process, the decoding process, ends. The filter image (decoded image) after the D/A conversion is output and displayed on a display (not illustrated).

<Configuration Example of Deblocking Filter 31*a*>

Figure 12:
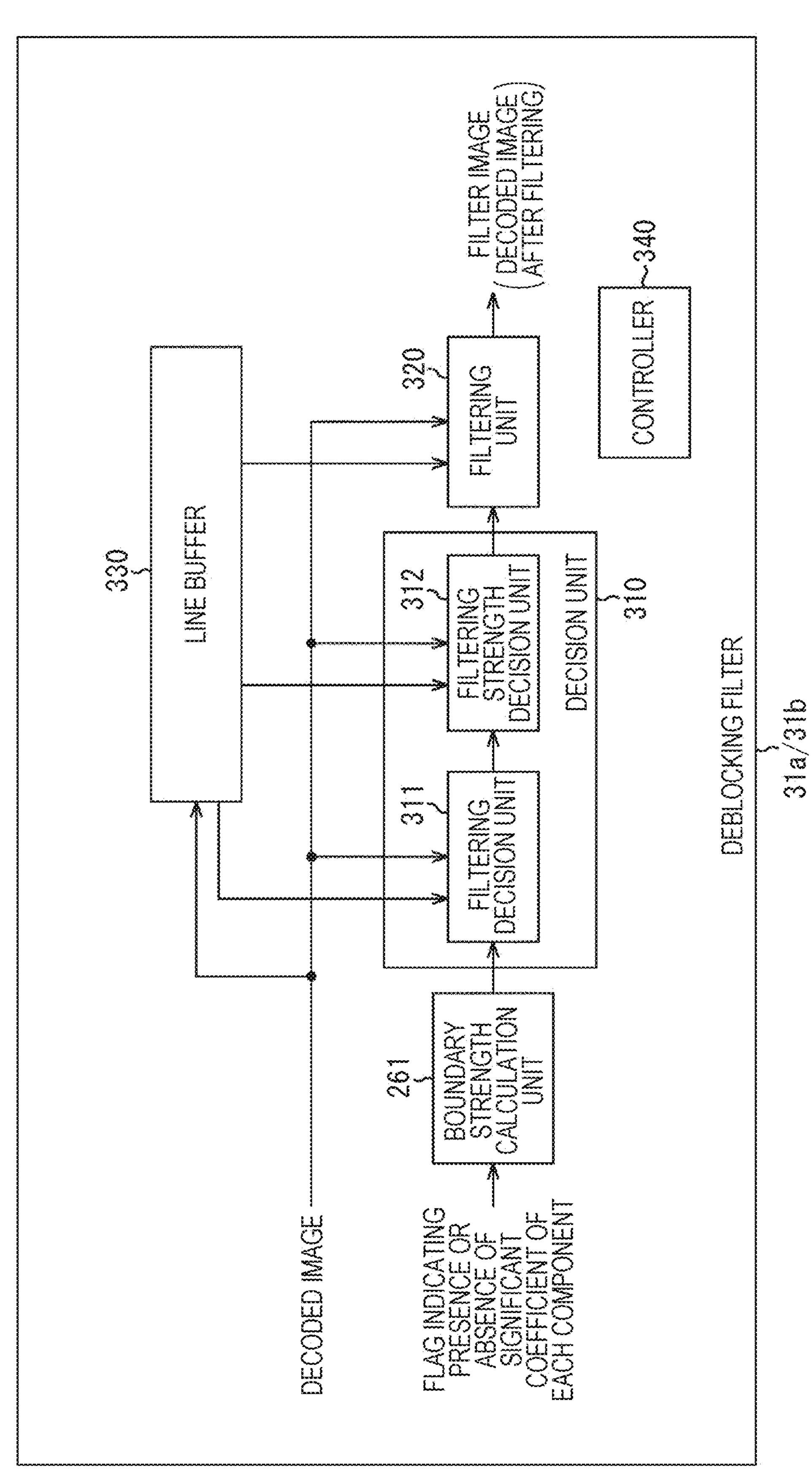
FIG. 12 is a block diagram illustrating a configuration example of a deblocking filter 31*a*.

FIG. 12 is a block diagram illustrating a configuration example of the deblocking filter 31*a*.

Note that, the deblocking filter 31*b* is configured similarly to the deblocking filter 31*a*.

In FIG. 12, the deblocking filter 31*a* includes a boundary strength calculation unit 261, a decision unit 310, a filtering unit 320, a line buffer 330, and a controller 340.

The boundary strength calculation unit 261 calculates bS (boundary strength) using the color difference-related parameters related to the color difference, targeting the block boundary of the decoded image. In a case where a signal in the YUV420 format is a calculation target of the bS, the boundary strength calculation unit 261 calculates the bS in units of four lines in the luminance component of the decoded image, that is, in units of two lines in the color difference component of the decoded image.

The color difference-related parameters used by the boundary strength calculation unit 261 to calculate the bS include a flag indicating the presence or absence of the significant coefficient of the U component in the block whose block boundary is located on a grid, and a flag indicating the presence or absence of the significant coefficient of the V component in the block. The color difference-related parameters including a flag indicating the presence or absence of the significant coefficient of each component (Y component, U component, V component) in each block is supplied to the boundary strength calculation unit 261 from the controller 340.

The boundary strength calculation unit 261 calculates the bS using the color difference-related parameters and the like from the controller 340. The boundary strength calculation unit 261 calculates the bS on the basis of whether or not the significant coefficient of the color difference component exists in two adjacent blocks sandwiching the block boundary that is a calculation target of the bs, and the like. The boundary strength calculation unit 261 supplies the bS to the decision unit 310.

Note that, as the method of calculating the bS, for example, the method described in the reference document REF4 or any other method can be adopted. Furthermore, as the bS, any value representing the boundary strength can be adopted. Here, as the bS, values 0, 1, and 2 that divide the boundary strength into three stages are adopted, and the stronger the boundary strength, the larger the value of the bS.

The decision unit 310 includes a filtering decision unit 311 and a filtering strength decision unit 312, and performs filtering decision.

The bS is supplied from the boundary strength calculation unit 261 to the filtering decision unit 311. Furthermore, the decoded image is supplied to the filtering decision unit 311 from the outside of the deblocking filter 31*a* (the calculation unit 30 in FIG. 8 or the calculation unit 65 in FIG. 10) or the line buffer 330.

The filtering decision unit 311 performs the application necessity decision using the bS from the boundary strength calculation unit 261 and, further, using the decoded image from the outside of the deblocking filter 31*a* or the line buffer 330, and the like.

The filtering decision unit 311 supplies the decision result of the application necessity decision to the filtering strength decision unit 312.

To the filtering strength decision unit 312, the decision result of the application necessity decision is supplied from the filtering decision unit 311, and also the decoded image is supplied from the outside of the deblocking filter 31*a* or the line buffer 330.

In a case where the decision result of the application necessity decision from the filtering decision unit 311 indicates that the deblocking filter is applied, the filtering strength decision unit 312 performs the filtering strength decision for deciding the filtering strength of the deblocking filter applied to the color difference component of the decoded image by using the decoded image from the outside of the deblocking filter 31*a* or the line buffer 330. Then, the filtering strength decision unit 312 supplies the decision result of the filtering strength decision to the filtering unit 320 as the decision result of the filtering decision.

In the deblocking filter 31*a*, as the filter types of the deblocking filter applied to the color difference component of the decoded image, there are two filter types, for example, a weak filter and a chroma long filter having a larger number of taps than the weak filter, that is, having a stronger filtering strength. The decision result of the filtering strength indicates the weak filter or the chroma long filter.

Furthermore, in a case where the decision result of the application necessity decision from the filtering decision unit 311 indicates that the deblocking filter is not applied, the filtering strength decision unit 312 supplies the decision result of the application necessity decision to the filtering unit 320 as the decision result of the filtering decision.

To the filtering unit 320, the decision result of the filtering decision is supplied from the filtering strength decision unit 312, and also the decoded image is supplied from the outside of the deblocking filter 31*a* or the line buffer 330.

In a case where the decision result of the filtering decision from (the filtering strength decision unit 312 of) the decision unit 310 indicates that the deblocking filter is not applied, the filtering unit 320 outputs the decoded image as it is without applying the deblocking filter to the decoded image.

Furthermore, in a case where the decision result of the filtering decision from the filtering strength decision unit 312 indicates the chroma long filter or the weak filter, the filtering unit 320 performs a filtering process of applying the chroma long filter or the weak filter indicated by the decision result of the filtering decision to the decoded image.

That is, the filtering unit 320 performs calculation as a filtering process of the target pixels that are color difference pixels to be subjected to the filtering process, in the decoded image from the outside of the deblocking filter 31*a* or the line buffer 330, by using color difference pixels in the vicinity of the target pixels.

Here, a pixel used for the filtering decision of the decision unit 310 (a pixel referred to for the filtering decision) is also referred to as a filter reference pixel. Furthermore, a pixel used for the calculation as the filtering process of the filtering unit 320 is also referred to as a filter constituent pixel.

The filtering unit 320 outputs the color difference components obtained by the filtering process of the target pixels as the color difference components of the filter pixels (the pixels constituting the filter image after the filtering process).

A decoded image is supplied to the line buffer 330 from the outside of the deblocking filter 31*a*. The line buffer 330 appropriately stores the color difference components of the decoded image from the outside of the deblocking filter 31*a*. Note that, the line buffer 330 has a storage capacity for storing the color difference components for a predetermined number of lines (number of rows), and when the color difference components for the storage capacity are stored, a new color difference component is stored in the form of being overwritten on the oldest color difference component.

Here, it is assumed that the deblocking filter 31*a* processes the decoded image in the order of raster scan.

In the deblocking filter 31*a*, the process is performed in units of a predetermined block (which may be, for example, a block of a unit in which orthogonal transform is performed, or a block including a unit in which orthogonal transform is performed). In the deblocking filter 31*a*, for example, a plurality of blocks such as those for one line can be processed in the order of raster scan, and can also be processed in parallel.

The decision unit 310 and the filtering unit 320 include a built-in internal buffer having a capacity capable of storing color difference components of a line in the horizontal direction included in a target block that is a block to be processed by the deblocking filter 31*a*. The decision unit 310 and the filtering unit 320 store the color difference components of the line in the horizontal direction included in the target block in the internal buffer, and use the color difference components stored in the internal buffer as color difference components of the filter reference pixel and the filter constituent pixel, to process the target block.

In a case where the deblocking filter 31*a* is applied to the horizontal block boundary on the upper side of the target block, color difference components of pixels in the target block and color difference components of pixels in a block adjacent to the upper side of the target block are required.

The color difference components of the pixels in the target block are stored in the internal buffer when the target block is processed. On the other hand, since the color difference components of the pixels in the block adjacent to the upper side of the target block are not the color difference components of the pixels in the target block, the values are not stored in the internal buffer when the target block is processed.

Thus, the line buffer 330 stores color difference components of pixels of a line (pixels belonging a line) necessary for applying the deblocking filter 31*a* to the horizontal block boundary on the upper side of the target block among lines in the horizontal direction included in the block adjacent to the upper side of the target block. The pixels of the line necessary for applying the deblocking filter 31*a* are pixels that are used for the filter reference pixel and the filter constituent pixel.

The controller 340 controls each block constituting the deblocking filter 31*a*. Furthermore, the controller 340 acquires color difference-related parameters and the like necessary for calculating the bS by performing generation or the like, and supplies the parameters to the boundary strength calculation unit 261.

Note that, in the present embodiment, it is assumed that the deblocking filter 31*a* processes, for example, the decoded images in the order of raster scan. However, the deblocking filter 31*a* can perform the decoded image in an order other than the order of raster scan. For example, the deblocking filter 31*a* can repeat processing the decoded image from top to bottom, from left to right. In this case, the horizontal (lateral) (left and right) and vertical (longitudinal) (up and down) described below are reversed (swapped).

Figure 13:
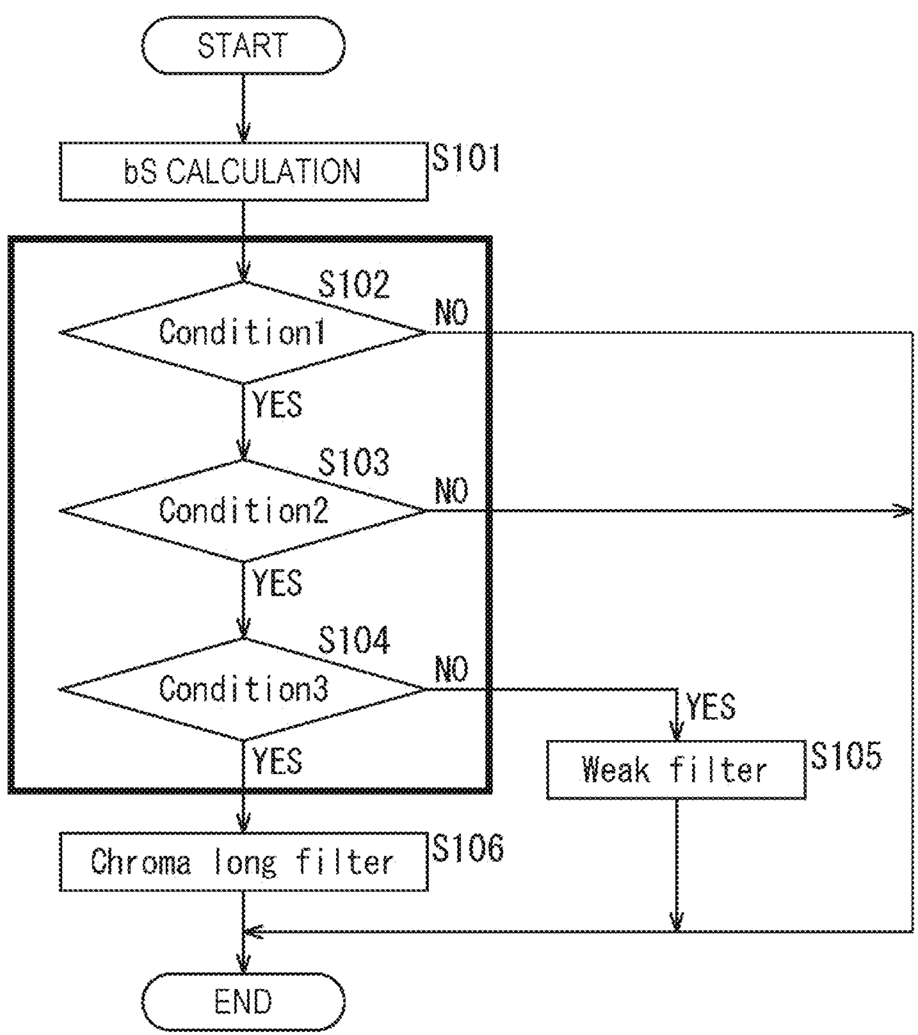
FIG. 13 is a flowchart explaining a process of the deblocking filter 31*a*.

FIG. 13 is a flowchart explaining the process of the deblocking filter 31*a* of FIG. 12.

In the deblocking filter 31*a*, the line buffer 330 appropriately stores the color difference components of the decoded image supplied from the outside of the deblocking filter 31*a*.

Then, in step S101, the boundary strength calculation unit 261 calculates the bS for the block boundary located on the grid and supplies the bS to the decision unit 310, and the process proceeds to step S102.

In steps S102 to S104, the decision unit 310 performs the filtering decision for each partial block boundary (partial vertical block boundary and partial horizontal block boundary).

That is, in step S102, the decision unit 310 decides whether or not a condition 1 described later is satisfied.

In a case where it is decided in step S102 that the condition 1 is not satisfied, the decision unit 310 decides that the deblocking filter 31*a* is not applied, and the filtering unit 320 does not perform the filtering process to (pixels of a line orthogonal to) the partial block boundary for which it is decided that the condition 1 is not satisfied, and the process ends.

Furthermore, in a case where it is decided in step S102 that the condition 1 is satisfied, the process proceeds to step S103, and the decision unit 310 decides whether or not a condition 2 described later is satisfied.

In a case where it is decided in step S103 that the condition 2 is not satisfied, the decision unit 310 decides that the deblocking filter 31*a* is not applied, and the filtering unit 320 does not perform the filtering process to the partial block boundary for which it is decided that the condition 2 is not satisfied, and the process ends.

Furthermore, in a case where it is decided in step S103 that the condition 2 is satisfied, the process proceeds to step S104, and the decision unit 310 decides whether or not a condition 3 described later is satisfied.

In a case where it is decided in step S104 that the condition 3 is not satisfied, the process proceeds to step S105, and the decision unit 310 decides that the weak filter is applied. Then, the filtering unit 320 performs a filtering process of the weak filter to the partial block boundary for which it is decided that the condition 3 is not satisfied, and the process ends.

Furthermore, in a case where it is decided in step S104 that the condition 3 is satisfied, the process proceeds to step S106, and the decision unit 310 decides that the chroma long filter is applied. Then, the filtering unit 320 performs a filtering process of the chroma long filter to the partial block boundary for which it is decided that the condition 3 is satisfied, and the process ends.

In FIG. 13, for example, the decision in steps S102 and S103 corresponds to the adaptation necessity decision, and the decision in step S104 corresponds to the filtering strength decision.

Note that, even in a case where it is decided in step S103 that the condition 2 is not satisfied, when the bS is 2, which indicates that the boundary strength is the strongest, it can be decided in the decision unit 310 that the weak filter is applied. Then, in the filtering unit 320, the filtering process of the weak filter can be performed on the partial block boundary whose bS is 2 although it is decided that the condition 2 is not satisfied.

<Filtering Decision of YUV420 Format>

Figure 14:
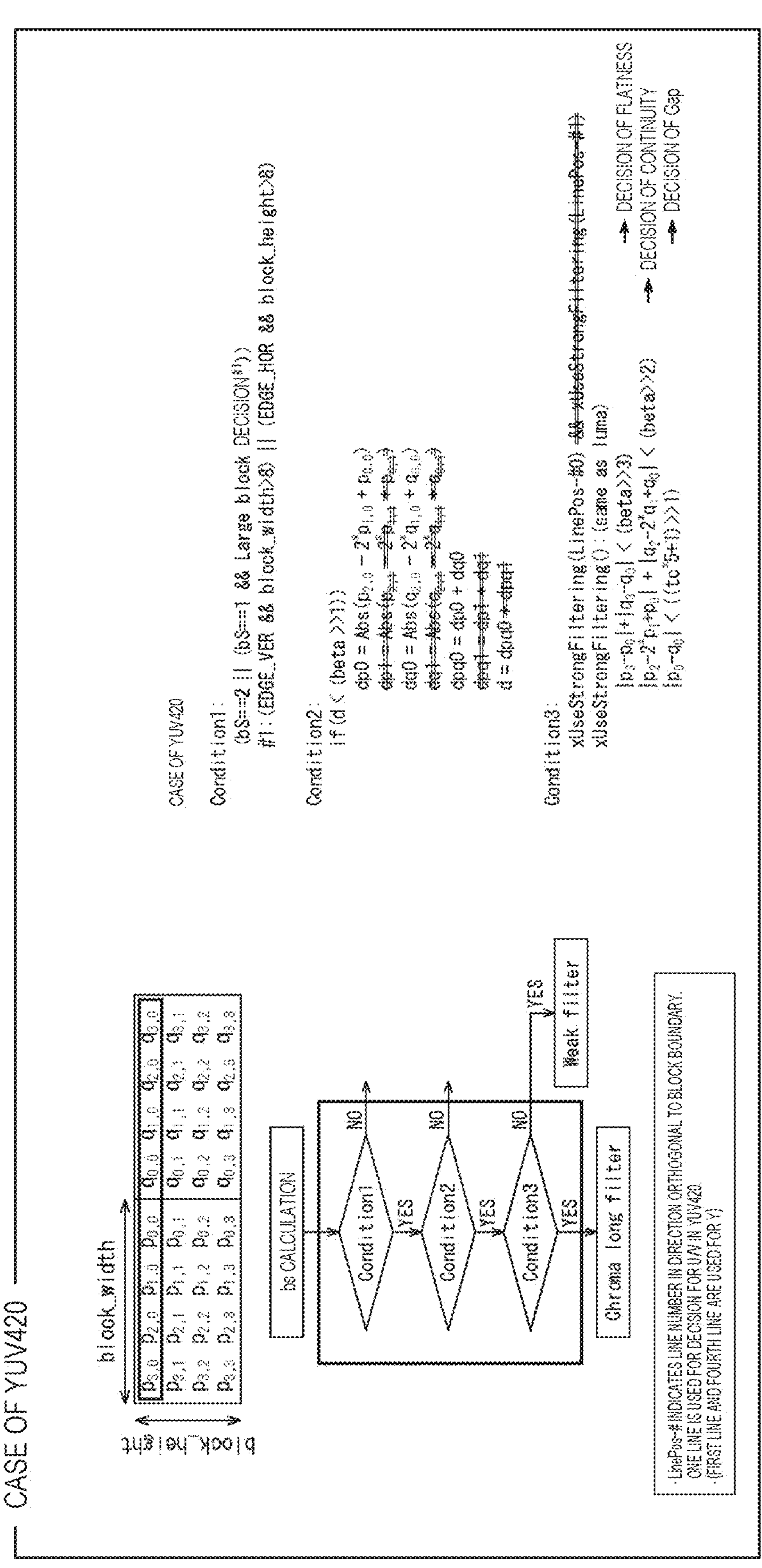
FIG. 14 is a diagram explaining filtering decision in a case where the color format is the YUV420 format.

FIG. 14 is a diagram explaining filtering decision in a case where the color format is the YUV420 format.

That is, FIG. 14 is a diagram explaining the filtering decision (vertical block boundary filtering decision) for the partial vertical block boundary of the decoded image in the YUV420 format.

In the YUV420 format, if the partial vertical block boundary of the luminance component is the vertical block boundary for four lines in the horizontal direction, the partial vertical block boundary of the color difference component is ½ of the partial vertical block boundary of the luminance component, that is, a vertical block boundary for two lines in the horizontal direction.

For example, if the partial vertical block boundary of the luminance component is a partial vertical block boundary b as a combined portion of the partial vertical block boundaries b1 and b2 illustrated in FIG. 3, the vertical block boundary of the color difference component is the partial vertical block boundary b1 and the partial vertical block boundary b2.

In this case, the length of the partial vertical block boundary of the luminance component is four pixels (for four lines), and the length of the partial vertical block boundary of the color difference component is two pixels (for two lines).

For the luminance component in the YUV420 format, the deblocking filter 31*a* performs the vertical block boundary filtering decision for the partial vertical block boundary of the luminance component by using the luminance components of pixels of two lines, the first line and the fourth line, which are (horizontal) lines located at both ends of the partial vertical block boundary of the luminance component, out of four lines in the horizontal direction of the luminance component orthogonal to the partial vertical block boundary of the luminance component.

The vertical block boundary filtering decision for the partial vertical block boundary of the luminance component here is filtering decision for deciding whether or not a deblocking filter is applied to the luminance components of pixels of four (horizontal) lines, the first line to the fourth line, orthogonal to the partial vertical block boundary of the luminance component.

Furthermore, the deblocking filter 31*a* performs the vertical block boundary filtering decision for the partial vertical block boundary of the color difference component by using the color difference component of the color difference pixel of the first line of two lines in the horizontal direction of the color difference component orthogonal to the partial vertical block boundary of the color difference component.

The vertical block boundary filtering decision for the partial vertical block boundary of the color difference component here is filtering decision for deciding whether or not a deblocking filter is applied to the color difference components of pixels of two (horizontal) lines, the first line to the second line, orthogonal to the partial vertical block boundary of the color difference component.

For the YUV420 format, the truth or falsehood (1 or 0) of the equation (14) is decided, as the condition 1, in the vertical block boundary filtering decision of the color difference component.

(bS==2||(bS==1 && Large block decision))

Large block decision:(EDGE_VER && block_width>8)||(EDGE_HOR && block_height>8) (14)

Here, the bS in the equation (14) is the bS calculated from two adjacent blocks sandwiching the partial vertical block boundary. EDGE_VER is true (1) in a case where the partial block boundary that is a target of the filtering decision is a partial vertical block boundary, and false (0) otherwise (in a case where it is a partial horizontal block boundary). EDGE_HOR is true in a case where the partial block boundary that is a target of the filtering decision is a partial horizontal block boundary, and false otherwise (in a case where it is a partial vertical block boundary).

For the YUV420 format, as the condition 2, the truth or falsehood of the equation (15) is decided.

$$d<(\text{beta}>>1) \quad (15)$$

A>>B represents that A is shifted to the right by B bits.

The d in the equation (15) is calculated in accordance with the equations (16) to (19).

$$dp0=\text{Abs}(p_{2,0}-2*p_{1,0}+p_{0,0}) \quad (16)$$

$$dq0=\text{Abs}(q_{2,0}-2*q_{1,0}+q_{0,0}) \quad (17)$$

$$dpq0=dp0+dq0 \quad (18)$$

$$d=dpq0 \quad (19)$$

Here, in the filtering decision of the reference document REF4, the decision of the condition C92 similar to that of the Non-Patent Document 1 is performed. In calculation of the d of the condition C92, as indicated in the equations (1) to (7), the color difference components $p_{2,0}$, $p_{1,0}$, $p_{0,0}$, $q_{2,0}$, $q_{1,0}$, and $q_{0,0}$, and $p_{2,1}$, $p_{1,1}$, $p_{0,1}$, $q_{2,1}$, $q_{1,1}$, and $q_{0,1}$ are used of the color difference pixels of the two lines L11 and L12 of the color difference component orthogonal to the partial vertical block boundary b1 (FIG. 3).

On the other hand, in the vertical block boundary filtering decision of the deblocking filter 31*a*, for the color difference component, in calculation of the d of the condition 2, as indicated in the equations (16) to (19), the color difference components $p_{2,0}$, $p_{1,0}$, $p_{0,0}$, $q_{2,0}$, $q_{1,0}$, and $q_{0,0}$ are used of only the color difference pixels of the first line L11 of the two lines L11 and L12 of the color difference component orthogonal to the partial vertical block boundary b1.

For that reason, the equations (16) to (19) are equations obtained by deleting, from the equations (1) to (7), portions related to the color difference components $p_{2,1}$, $p_{1,1}$, $p_{0,1}$, $q_{2,1}$, $q_{1,1}$, and $q_{0,1}$ of the color difference pixels of the second line L12.

For the YUV420 format, as the condition 3, the truth or falsehood of the equation (20) is decided.

xUseStrongFiltering(LinePos-#0) (20)

LinePos-#j-1 represents the j-th line of the two lines L11 and L12 of the color difference component orthogonal to the partial vertical block boundary b1.

The function xUseStrongFiltering (LinePos-#j-1) in the equation (20) is a function similar to that used for the filtering decision of the luminance component, and returns a value of the truth or falsehood (1 or 0) depending on whether or not the equations (21) to (23) are satisfied.

$$|p3-p0|+|q3-q0|<(\text{beta}>>3) \quad (21)$$

$$|p2-2*p1+p0|+|q2-2*q1+q0|<(\text{beta}>>2) \quad (22)$$

$$|p0-q0|<((tc*5+1)>>1) \quad (23)$$

In the equations (21) to (23), $p_i$ and $q_k$ represent the color difference components of the color difference pixels $p_{i,j}$ and $q_{k,j}$ of the i-th and k-th columns from the partial vertical block boundary b1, in the j-th row of the two adjacent blocks Bp and Bq sandwiching the partial vertical block boundary b1, and the index j of $p_{i,j}$ and $q_{k,j}$ is omitted.

Furthermore, to is a parameter given depending on the quantization parameter.

|p3−p0|+|q3−q0| in the equation (21) represents flatness of the partial vertical block boundary b1. |p2−2*p1+p0|+|q2−2*q1+q0| in the equation (22) represents continuity of the partial vertical block boundary b1. |p0−q0| in the equation (23) represents a gap at the partial vertical block boundary b1.

Here, in the filtering decision of the color difference component of the reference document REF4, the truth or falsehood of the equation (24) is decided.

xUseStrongFiltering(LinePos-#0)&& xUseStrongFiltering(LinePos-#1) (24)

In decision of the truth or falsehood of the equation (24), the color difference components $p_{3,0}$, $p_{2,0}$, $p_{1,0}$, $p_{0,0}$, $q_{3,0}$, $q_{2,0}$, $q_{1,0}$, and $q_{0,0}$, and $p_{3,1}p_{2,1}$, $p_{1,1}$, $p_{0,1}$, $q_{3,1}$, $q_{2,1}$, $q_{1,1}$, and $q_{0,1}$ are used of the color difference pixels of the two lines L11 and L12 of the color difference component orthogonal to the partial vertical block boundary b1.

On the other hand, in the filtering decision of the color difference component of the deblocking filter 31*a*, in decision of the truth or falsehood of the condition 3 of the equation (20), the color difference components $p_{3,0}$, $p_{2,0}$, $p_{1,0}$, $p_{0,0}$, $q_{3,0}$, $q_{2,0}$, $q_{1,0}$, and $q_{0,0}$ are used of only the color difference pixels of the first line L11 of the two lines L11 and L12 of the color difference component orthogonal to the partial vertical block boundary b1.

For that reason, the equation (20) is an equation obtained by deleting, from the equation (24), a portion xUseStrongFiltering (LinePos-#1) related to the color difference components $p_{3,1}$, $p_{2,1}$, $p_{1,1}$, $p_{0,1}$, $q_{2,1}$, $q_{1,1}$, and $q_{0,1}$ of the color difference pixels of the second line L12.

For the YUV420 format, the filtering decision (horizontal block boundary filtering decision) for the partial horizontal block boundary of the decoded image is performed similarly to the vertical block boundary filtering decision, and thus the description thereof will be omitted.

Note that, here, for the color difference component of the YUV420 format, the vertical block boundary filtering decision is performed by using the color difference component of the color difference pixels of the first line of the two lines in the horizontal direction of the color difference component orthogonal to the partial vertical block boundary of the color difference component.

For the color difference component of the YUV420 format, the vertical block boundary filtering decision can be performed by using the color difference components of the color difference pixels of the second line, not the first line of the two lines in the horizontal direction of the color difference component orthogonal to the partial vertical block boundary of the color difference component. The same applies to the horizontal block boundary filtering decision.

<Filtering Decision of YUV444 Format>

Figure 15:
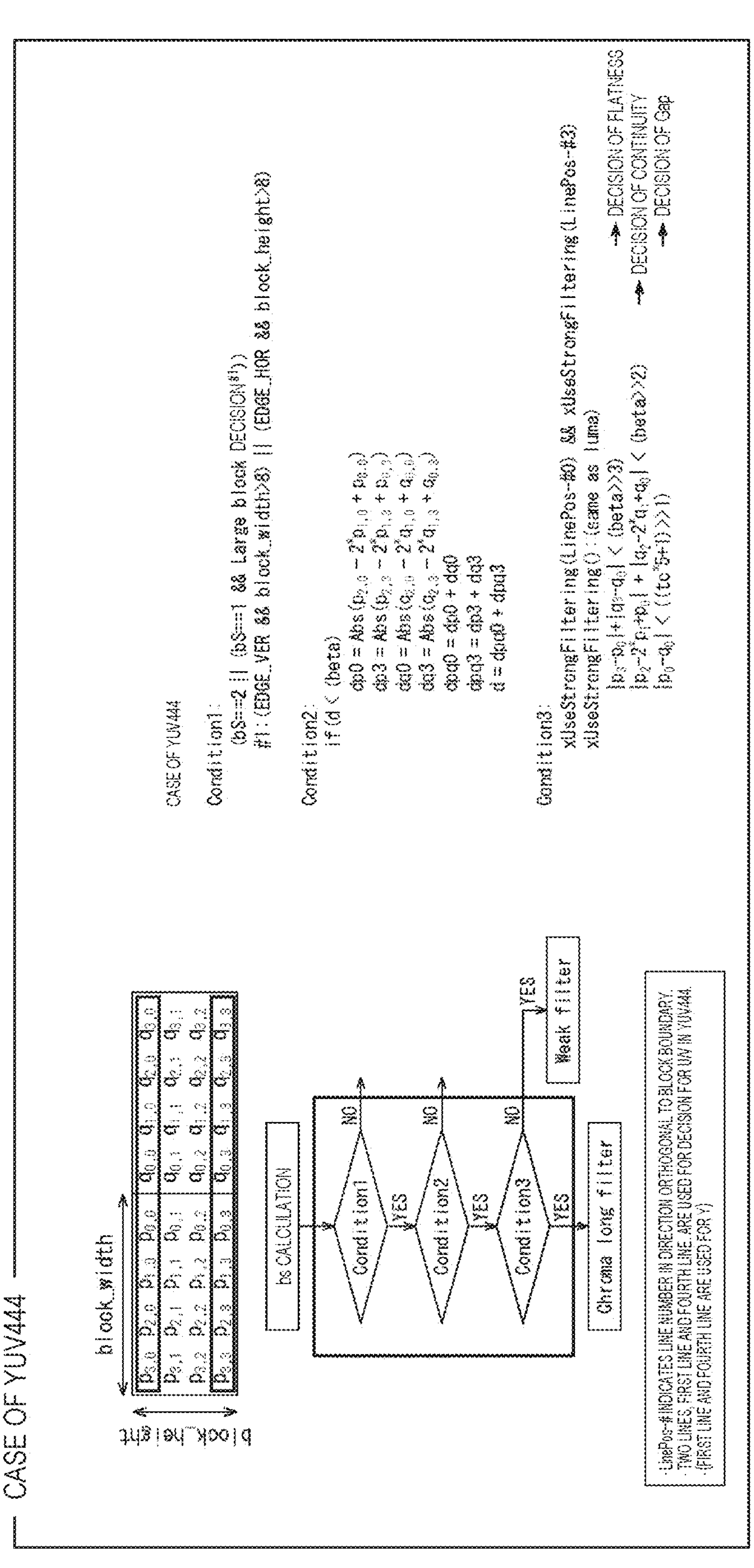
FIG. 15 is a diagram explaining filtering decision in a case where the color format is the YUV444 format.

FIG. 15 is a diagram explaining filtering decision in a case where the color format is the YUV444 format.

That is, FIG. 15 is a diagram explaining the vertical block boundary filtering decision for the partial vertical block boundary of the decoded image in the YUV444 format.

In the YUV444 format, if the partial vertical block boundary of the luminance component is the vertical block boundary for four lines in the horizontal direction, the partial vertical block boundary of the color difference component is a vertical block boundary for four lines in the horizontal direction, similarly to the partial vertical block boundary of the luminance component.

For example, the partial vertical block boundaries of the luminance component and the color difference component both are the partial vertical block boundary b as the combined portion of the partial vertical block boundaries b1 and b2 illustrated in FIG. 3.

In this case, the lengths of the partial vertical block boundaries of the luminance component and the color difference component both are four pixels (for four lines).

For the luminance component in the YUV444 format, the deblocking filter 31*a* performs the vertical block boundary filtering decision for the partial vertical block boundary of the luminance component by using the luminance components of pixels of two lines, the first line and the fourth line, which are (horizontal) lines located at both ends of the partial vertical block boundary of the luminance component, out of four lines in the horizontal direction of the luminance component orthogonal to the partial vertical block boundary of the luminance component.

The vertical block boundary filtering decision for the partial vertical block boundary of the luminance component here is filtering decision for deciding whether or not a deblocking filter is applied to the luminance components of pixels of four lines, the first line to the fourth line, orthogonal to the partial vertical block boundary of the luminance component.

Furthermore, the deblocking filter 31*a* performs the vertical block boundary filtering decision for the partial vertical block boundary of the color difference component by using the color difference components of the color difference pixels of a line identical to a line used when performing the vertical block boundary filtering decision that decides whether or not a deblocking filter is applied to the luminance component.

That is, the deblocking filter 31*a* performs the vertical block boundary filtering decision for the partial vertical block boundary of the color difference component by using the color difference components of the color difference pixels of two lines, the first line and the fourth line, which are (horizontal) lines located at both ends of the partial vertical block boundary of the color difference component, out of four lines in the horizontal direction of the color difference component orthogonal to the partial vertical block boundary of the color difference component.

The vertical block boundary filtering decision for the partial vertical block boundary of the color difference component here is filtering decision for deciding whether or not a deblocking filter is applied to the color difference components of pixels of four lines, the first line to the fourth line, orthogonal to the partial vertical block boundary of the color difference component.

For the YUV444 format, in the vertical block boundary filtering decision of the color difference component, as the condition 1, the truth or falsehood of the equation (14) is decided, similarly to the YUV420 format.

For the YUV444 format, as the condition 2, the truth or falsehood of the equation (25) is decided.

$$d<beta \quad (25)$$

The d in the equation (25) is calculated in accordance with the equations (26) to (32).

$$dp0=Abs(p2,0-2*p1,0+p0,0) \quad (26)$$

$$dp3=Abs(p2,3-2*p1,3+p0,3) \quad (27)$$

$$dq0=Abs(q2,0-2*q1,0+q0,0) \quad (28)$$

$$dpq0=dp0+dq0 \quad (30)$$

$$dpq3=dp3+dq3 \quad (31)$$

$$d=dpq0+dpq3 \quad (32)$$

In the vertical block boundary filtering decision of the deblocking filter 31*a*, for the color difference component, in calculation of the d in the condition 2, as indicated in the equations (26) to (32), out of the four lines L11, L12, L21, and L22 of the color difference component orthogonal to the partial vertical block boundary b, the color difference components $p_{2,0}$, $p_{1,0}$, $p_{0,0}$, $q_{2,0}$, $q_{1,0}$, and $q_{0,0}$ of the color difference pixels of the first line L11, and the color difference components $p_{2,3}$, $p_{1,3}$, $p_{0,3}$, $q_{2,3}$, $q_{1,3}$, and $q_{0,3}$ of the color difference pixels of the fourth line L22 are used.

For the YUV444 format, as the condition 3, the truth or falsehood of the equation (33) is decided.

xUseStrongFiltering(LinePos-#0)& & xUseStrongFiltering(LinePos-#3) (33)

The function xUseStrongFiltering (LinePos-#j-1) returns a value of the truth or falsehood depending on whether or not the equations (21) to (23) are satisfied, as described in FIG. 14.

Thus, in the vertical block boundary filtering decision of the deblocking filter 31*a*, in decision of the truth or falsehood of the condition 3 of the equation (33), out of the four lines L11, L12, L21, and L22 of the color difference component orthogonal to the partial vertical block boundary b, the color difference components $p_{3,0}$, $p_{2,0}$, $p_{1,0}$, $p_{0,0}$, $q_{3,0}$, $q_{2,0}$, $q_{1,0}$, and $q_{0,0}$ of the color difference pixels of the first line L11, and the color difference components $p_{3,3}$, $p_{2,3}$, $p_{1,3}$, $p_{0,3}$, $q_{3,3}$, $q_{2,3}$, $q_{1,3}$, and $q_{0,3}$ of the color difference pixels of the fourth line L22 are used.

For the YUV444 format, the filtering decision (horizontal block boundary filtering decision) for the partial horizontal block boundary of the decoded image is performed similarly to the vertical block boundary filtering decision, and thus the description thereof will be omitted.

Note that, here, for the luminance component and color difference component of the YUV444 format, the vertical block boundary filtering decision is performed by using the pixels of the first line and the fourth line of the four lines in the horizontal direction orthogonal to the partial vertical block boundary.

For the YUV444 format, the vertical block boundary filtering decision can be performed by using pixels of any one or more lines other than the first line and fourth line of the four lines in the horizontal direction orthogonal to the partial vertical block boundary. However, in the vertical block boundary filtering decision of the color difference component, pixels are used of the same line used in the vertical block boundary filtering decision of the luminance component. The same applies to the horizontal block boundary filtering decision.

<Filtering Decision of YUV422 Format>

Figure 16:
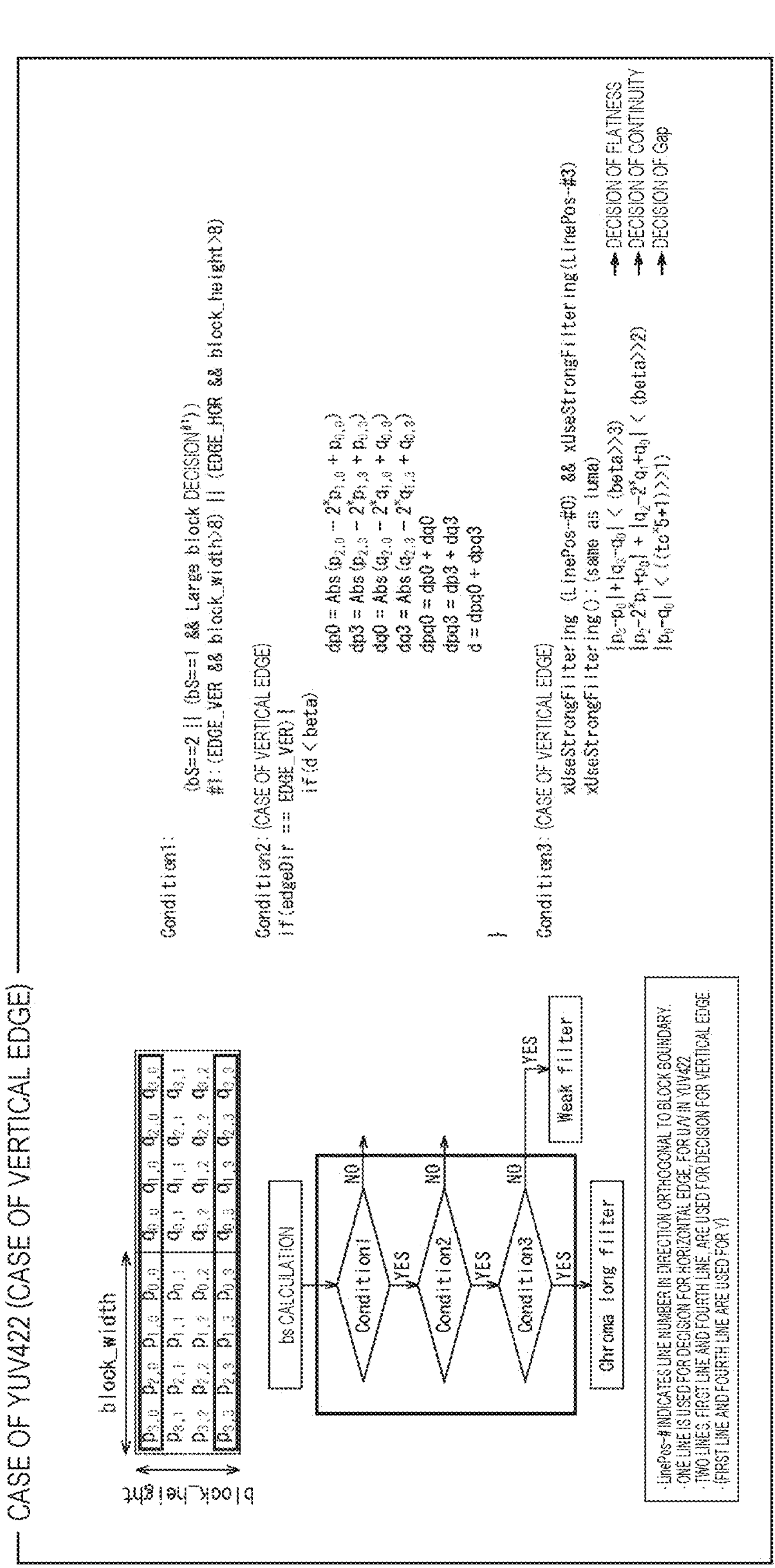
FIG. 16 is a diagram explaining filtering decision in a case where the color format is the YUV422 format.

FIG. 16 is a diagram explaining filtering decision in a case where the color format is the YUV422 format.

That is, FIG. 16 is a diagram explaining the vertical block boundary filtering decision for the partial vertical block boundary of the decoded image in the YUV422 format.

In the YUV422 format, if the partial vertical block boundary of the luminance component is the vertical block boundary for four lines in the horizontal direction, the partial vertical block boundary of the color difference component is a vertical block boundary for four lines in the horizontal direction, similarly to the partial vertical block boundary of the luminance component.

For example, the partial vertical block boundaries of the luminance component and the color difference component both are the partial vertical block boundary b as the combined portion of the partial vertical block boundaries b1 and b2 illustrated in FIG. 3.

In this case, the lengths of the partial vertical block boundaries of the luminance component and the color difference component both are four pixels (for four lines).

For the luminance component in the YUV422 format, the deblocking filter 31*a* performs the vertical block boundary filtering decision for the partial vertical block boundary of the luminance component by using the luminance components of pixels of two lines, the first line and the fourth line, which are (horizontal) lines located at both ends of the partial vertical block boundary of the luminance component, out of four lines in the horizontal direction of the luminance component orthogonal to the partial vertical block boundary of the luminance component.

The vertical block boundary filtering decision for the partial vertical block boundary of the luminance component here is filtering decision for deciding whether or not a deblocking filter is applied to the luminance components of pixels of four lines, the first line to the fourth line, orthogonal to the partial vertical block boundary of the luminance component.

Furthermore, the deblocking filter 31*a* performs the vertical block boundary filtering decision for the partial vertical block boundary of the color difference component by using the color difference components of the color difference pixels of a line identical to a line used when performing the vertical block boundary filtering decision that decides whether or not a deblocking filter is applied to the luminance component.

That is, the deblocking filter 31*a* performs the vertical block boundary filtering decision for the partial vertical block boundary of the color difference component by using the color difference components of the color difference pixels of two lines, the first line and the fourth line, which are (horizontal) lines located at both ends of the partial vertical block boundary of the color difference component, out of four lines in the horizontal direction of the color difference component orthogonal to the partial vertical block boundary of the color difference component.

The vertical block boundary filtering decision for the partial vertical block boundary of the color difference component here is filtering decision for deciding whether or not a deblocking filter is applied to the color difference components of pixels of four lines, the first line to the fourth line, orthogonal to the partial vertical block boundary of the color difference component.

For the YUV422 format, in the vertical block boundary filtering decision of the color difference component, as the condition 1, the truth or falsehood of the equation (14) is decided, similarly to the YUV420 format.

For the YUV422 format, as the condition 2, the truth or falsehood of the equations (34) and (35) is decided.

$$\text{edgeDir}==\text{EDGE\_VER} \tag{34}$$

$$d<\text{beta} \tag{35}$$

In edgeDir, EDGE_VER is set in a case where the partial block boundary that is a target of the filtering decision is the partial vertical block boundary, and EDGE_HOR is set in a case where the partial block boundary that is the target of the filtering decision is the partial horizontal block boundary.

The d in the equation (35) is calculated in accordance with the equations (26) to (32) described in FIG. 15.

In the vertical block boundary filtering decision of the deblocking filter 31*a*, for the color difference component, in calculation of the d in the condition 2, as indicated in the equations (26) to (32), out of the four lines L11, L12, L21, and L22 of the color difference component orthogonal to the partial vertical block boundary b, the color difference components $p_{2,0}$, $p_{1,0}$, $p_{0,0}$, $q_{2,0}$, $q_{1,0}$, and $q_{0,0}$ of the color difference pixels of the first line L11, and the color difference components $p_{2,3}$, $p_{1,3}$, $p_{0,3}$, $q_{2,3}$, $q_{1,3}$, and $q_{0,3}$ of the color difference pixels of the fourth line L22 are used.

For the YUV422 format, as the condition 3, the truth or falsehood of the equation (33) described in FIG. 15 is decided.

Thus, for the YUV422 format, in the vertical block boundary filtering decision of the deblocking filter 31*a*, similarly to the case of the YUV444 described in FIG. 15, in decision of the truth or falsehood of the condition 3 of the equation (33), out of the four lines L11, L12, L21, and L22 of the color difference component orthogonal to the partial vertical block boundary b, the color difference components $p_{3,0}$, $p_{2,0}$, $p_{1,0}$, $p_{0,0}$, $q_{3,0}$, $q_{2,0}$, $q_{1,0}$, and $q_{0,0}$ of the color difference pixels of the first line L11, and the color difference components $p_{3,3}$, $p_{2,3}$, $p_{1,3}$, $p_{0,3}$, $q_{3,3}$, $q_{2,3}$, $q_{1,3}$, and $q_{0,3}$ of the color difference pixels of the fourth line L22 are used.

Note that, here, for the luminance component and color difference component of the YUV422 format, the vertical block boundary filtering decision is performed by using the pixels of the first line and the fourth line of the four lines in the horizontal direction orthogonal to the partial vertical block boundary.

For the YUV422 format, the vertical block boundary filtering decision can be performed by using pixels of any one or more lines other than the first line and fourth line of the four lines in the horizontal direction orthogonal to the partial vertical block boundary. However, in the vertical block boundary filtering decision of the color difference component, pixels are used of the same line used in the vertical block boundary filtering decision of the luminance component.

FIG. 17 is a diagram explaining filtering decision in a case where the color format is the YUV422 format. That is, FIG. 17 is a diagram explaining the filtering decision (horizontal block boundary filtering decision) for the partial horizontal block boundary of the decoded image in the YUV422 format.

Note that, in FIG. 17, a description will be given assuming that the block boundary BB is not a vertical block boundary but a horizontal block boundary in FIG. 3. For example, it is assumed that the block Bp and the block Bq are the blocks above and below the (horizontal) block boundary BB, respectively. In this case, as described in FIG. 3, in $p_{i,j}$ and $q_{k,j}$, i and k are row indexes and j is a column index.

Furthermore, the partial block boundaries b1, b2, and b are partial horizontal block boundaries.

In the YUV422 format, assuming that the partial horizontal block boundary of the luminance component is the horizontal block boundary for four lines in the vertical direction, the partial horizontal block boundary of the color difference component is ½ of the partial horizontal block boundary of the luminance component, that is, the horizontal block boundary for two lines in the vertical direction.

For example, if the partial horizontal block boundary of the luminance component is the partial horizontal block boundary b as the combined portion of the partial horizontal block boundaries b1 and b2 illustrated in FIG. 3, the horizontal block boundary of the color difference component is the partial horizontal block boundary b1 and the partial horizontal block boundary b2.

In this case, the length of the partial horizontal block boundary of the luminance component is four pixels (for four lines), and the length of the partial horizontal block boundary of the color difference component is two pixels (for two lines).

For the luminance component in the YUV422 format, the deblocking filter 31*a* performs the horizontal block boundary filtering decision for the partial horizontal block boundary of the luminance component by using the luminance components of pixels of two lines, the first line and the fourth line, which are (vertical) lines located at both ends of the partial horizontal block boundary of the luminance component, out of four lines in the vertical direction of the luminance component orthogonal to the partial horizontal block boundary of the luminance component.

The horizontal block boundary filtering decision for the partial horizontal block boundary of the luminance component here is filtering decision for deciding whether or not a deblocking filter is applied to the luminance component of pixels of four (vertical) lines, the first line to the fourth line, orthogonal to the partial horizontal block boundary of the luminance component.

Furthermore, the deblocking filter 31*a* performs the horizontal block boundary filtering decision for the partial horizontal block boundary of the color difference component by using the color difference component of the color difference pixel of the first line of two lines in the vertical direction of the color difference component orthogonal to the partial horizontal block boundary of the color difference component.

The horizontal block boundary filtering decision for the partial horizontal block boundary of the color difference component here is filtering decision for deciding whether or not a deblocking filter is applied to the color difference component of pixels of two (vertical) lines, the first line to the second line, orthogonal to the partial horizontal block boundary of the color difference component.

For the YUV422 format, in the horizontal block boundary filtering decision of the color difference component, as the condition 1, the truth or falsehood of the equation (14) is decided, similarly to the YUV420 format. However, for the YUV422 format, the bS of the equation (14) calculated in the horizontal block boundary filtering decision of the color difference component is the bS calculated from two adjacent blocks sandwiching the partial horizontal block boundary.

For the YUV422 format, in the horizontal block boundary filtering decision of the color difference component, as the condition 2, the truth or falsehood of the equations (36) and (37) is decided.

$$\text{edgeDir}==\text{EDGE\_HOR} \tag{36}$$

$$d<(\text{beta}>>1) \tag{37}$$

In edgeDir, EDGE_VER is set in a case where the partial block boundary that is a target of the filtering decision is the partial vertical block boundary, and EDGE_HOR is set in a case where the partial block boundary that is the target of the filtering decision is the partial horizontal block boundary.

The d in the equation (37) is calculated in accordance with the equations (16) to (19) described in FIG. 14.

In the horizontal block boundary filtering decision of the deblocking filter 31*a*, for the color difference component, in calculation of the d of the condition 2, as indicated in the equations (16) to (19), the color difference components $p_{2,0}$, $p_{1,0}$, $p_{0,0}$, $q_{2,0}$, $q_{1,0}$, and $q_{0,0}$ are used of only the color difference pixels of the first line L11 of the two lines L11 and L12 of the color difference component orthogonal to the partial horizontal block boundary b1.

For the YUV422 format, in the horizontal block boundary filtering decision of the color difference component, as the condition 3, the truth or falsehood of the equation (20) is decided.

Thus, in the filtering decision of the color difference component of the deblocking filter 31*a*, for the color difference component, in decision of the truth or falsehood of the condition 3 of the equation (20), the color difference components $p_{3,0}$, $p_{2,0}$, $p_{1,0}$, $p_{0,0}$, $q_{3,0}$, $q_{2,0}$, $q_{1,0}$, and $q_{0,0}$ are used of only the color difference pixels of the first line L11 of the two lines L11 and L12 of the color difference component orthogonal to the partial horizontal block boundary b1.

Note that, here, for the color difference component of the YUV422 format, the horizontal block boundary filtering decision is performed by using the color difference component of the color difference pixels of the first line of the two lines in the vertical direction of the color difference component orthogonal to the partial horizontal block boundary of the color difference component.

For the color difference component of the YUV422 format, the horizontal block boundary filtering decision can be performed by using the color difference components of the color difference pixels of the second line, not the first line of the two lines in the vertical direction of the color difference component orthogonal to the partial horizontal block boundary of the color difference component.

Note that, here, although the length of the partial block boundary of the luminance component is set to four pixels, the number of pixels (the number of lines) exceeding four pixels can be adopted as the length of the partial block boundary of the luminance component.

For example, as the length of the partial block boundary of the luminance component, 8 pixels, 16 pixels, or the like can be adopted.

In a case where a length of eight pixels is adopted as the length of the partial block boundary of the luminance component, for example, the lengths of the partial horizontal block boundary and the partial vertical block boundary of the color difference component in the YUV444 format, and the partial vertical block boundary in the YUV422 format are eight pixels similar to the case of the luminance component. Furthermore, the lengths of the partial horizontal block boundary in the YUV422 format and the partial horizontal block boundary and the partial vertical block boundary of the color difference component of the YUV420 format are four pixels, which is ½ of the case of the luminance component.

Moreover, the vertical block boundary filtering decision of the luminance component and the color difference component in the YUV422 format can be performed by using pixels of two lines adjacent to each other in the center of the partial vertical block boundary, in addition to the pixels of the lines located at both ends of the partial vertical block boundary among the lines orthogonal to the partial vertical block boundary.

For example, in a case where the length of the partial vertical block boundary of the luminance component and color difference component in the YUV422 format is eight pixels, it is possible to perform the vertical block boundary filtering decision that decides whether or not a deblocking filter is applied to pixels of each of the luminance component and color difference component of eight lines orthogonal to the partial vertical block boundary, by using the luminance component and color difference component of pixels of four lines, the first, fourth, fifth, and eighth lines, out of the eight lines orthogonal to the partial vertical block boundary.

The same applies to the horizontal block boundary filtering decision and the vertical block boundary filtering decision of the luminance component and the color difference component of the YUV444 format in the above points.

OTHERS (Application Target of the Present Technology)

The present technology can be applied to any image coding/decoding method. That is, unless inconsistent with the present technology described above, the specifications of various processes related to image coding/decoding, such as transform (inverse transform), quantization (inverse quantization), coding (decoding), and prediction, are arbitrary, and are not limited to the examples described above. Furthermore, unless inconsistent with the present technology described above, some of these processes may be omitted.

(Block)

Furthermore, in the present specification, "block" (not a block indicating a processing unit) used for description as a partial area or a unit of processing of an image (picture) indicates an arbitrary partial area in a picture, unless otherwise specified, and the size, shape, characteristics, and the like are not limited. For example, the "block" includes arbitrary partial areas (units of processing) such as the transform block (TB), transform unit (TU), prediction block (PB), prediction unit (PU), smallest coding unit (SCU), coding unit (CU), largest coding unit (LCU), coding tree block (CTB), coding tree unit (CTU), transform block, sub-block, macroblock, tile, or slice described in the reference documents REF1 to REF3 and the like.

(Unit of Processing)

A unit of data in which the various types of information described above is set, and a unit of data targeted by the various processes each are arbitrary and are not limited to the examples described above. For example, these information and processes each may be set for each Transform Unit (TU), Transform Block (TB), Prediction Unit (PU), Prediction Block (PB), Coding Unit (CU), Largest Coding Unit (LCU), sub-block, block, tile, slice, picture, sequence, or component, or data in units of data of those may be targeted. Of course, the unit of data can be set for each piece of information or process, and it is not necessary that the units of data of all the information and processes are unified. Note that, a storage location of these pieces of information is arbitrary, and may be stored in the header, parameter set, or the like of the unit of data described above. Furthermore, those may be stored in a plurality of locations.

(Control Information)

Control information related to the present technology described above may be transmitted from the coding side to the decoding side. For example, control information (for example, enabled flag) may be transmitted that controls whether or not the application of the present technology described above is permitted (or prohibited). Furthermore, for example, control information may be transmitted indicating an object to which the present technology is applied (or an object to which the present technology is not applied). For example, control information may be transmitted that specifies the block size (upper limit, lower limit, or both), frame, component, layer, or the like to which the present technology is applied (or for which application is permitted or prohibited).

(Block Size Information)

In specification of the size of the block to which the present technology is applied, the block size may not only be directly specified, but also be specified indirectly. For example, the block size may be specified by using identification information for identifying the size. Furthermore, for example, the block size may be specified by a ratio to or a difference from the size of a reference block (for example, the LCU, the SCU, and the like). For example, in a case where information for specifying the block size is transmitted as a syntax element or the like, the information for indirectly specifying the size as described above may be used as the information. By doing so, the amount of information can be reduced, and the coding efficiency can be improved in some cases. Furthermore, the specification of the block size also includes specification of a block size range (for example, specification of an allowable block size range, or the like).

OTHERS

Note that, in the present specification, the "flag" is information for identifying a plurality of states, and includes not only information used for identifying two states of true (1) or false (0), but also information capable of identifying three or more states. Thus, values that can be taken by the "flag" may be, for example, two values of 1/0, or three or more values. That is, the number of bits constituting the "flag" is arbitrary, and may be 1 bit or a plurality of bits. Furthermore, the identification information (including the flag) is assumed to include not only the identification information in the bitstream but also difference information of the identification information with respect to a certain reference information in the bitstream, so that the "flag" and "identification information" include not only the information but also the difference information with respect to the reference information, in the present specification.

Furthermore, various types of information (metadata, and the like) regarding the coded data (bitstream) may be transmitted or recorded in any form as long as those are associated with the coded data. Here, a term "associate" means that, for example, when processing one data, the other data is made to be usable (linkable). That is, the data associated with each other may be collected as one data, or may be individual data. For example, information associated with coded data (image) may be transmitted on a transmission line different from that for the coded data (image). Furthermore, for example, the information associated with the coded data (image) may be recorded in a recording medium different from that for the coded data (image) (or in a different recording area of the same recording medium). Note that, this "association" may be a part of data, not the entire data. For example, an image and information corresponding to the image may be associated with each other in an arbitrary unit such as a plurality of frames, one frame, or a portion within a frame.

Note that, in this specification, terms “combine”, “multiplex”, “add”, “integrate”, “include”, “store”, “put in”, “enclose, “insert”, and the like mean to combine a plurality of objects into one, for example, to combine coded data and metadata into one, and the terms mean one method of the “associate” described above.

The present technology can also be implemented as any configuration constituting a device or system, for example, a processor as a system large scale integration (LSI) or the like, a module using a plurality of processors and the like, a unit using a plurality of modules and the like, a set in which other functions are further added to the unit, or the like (that is, a configuration of a part of the device).

<Description of Computer to which the Present Technology is Applied>

Next, a series of processes described above can be performed by hardware or software. In a case where the series of processes is performed by software, a program constituting the software is installed in a general-purpose computer or the like.

FIG. 18 is a block diagram illustrating a configuration example of an embodiment of a computer in which a program for executing the series of processes described above is installed.

The program can be recorded in advance on a hard disk 905 or a ROM 903 as a recording medium incorporated in the computer.

Alternatively, the program can be stored (recorded) in a removable recording medium 911 driven by a drive 909. Such a removable recording medium 911 can be provided as so-called packaged software. Here, examples of the removable recording medium 911 include a flexible disk, a Compact Disc Read Only Memory (CD-ROM), a Magneto Optical (MO) disk, a Digital Versatile Disc (DVD), a magnetic disk, a semiconductor memory, and the like.

Note that, the program can be installed on the computer from the removable recording medium 911 as described above, or can be downloaded to the computer via a communications network or a broadcast network and installed on the hard disk 905 incorporated. That is, for example, the program can be wirelessly transferred from a download site to the computer via an artificial satellite for digital satellite broadcasting, or can be transmitted to the computer via a network such as a Local Area Network (LAN) or the Internet by wire.

The computer incorporates a Central Processing Unit (CPU) 902, and an input/output interface 910 is connected to the CPU 902 via a bus 901.

The CPU 902 executes the program stored in the Read Only Memory (ROM) 903 according to a command when the command is input by a user operating an input unit 907 or the like via the input/output interface 910. Alternatively, the CPU 902 loads the program stored in the hard disk 905 into a random access memory (RAM) 904 and executes the program.

The CPU 902 therefore performs the processing according to the above-described flowchart or the processing performed by the configuration of the above-described block diagram. Then, the CPU 902 causes the processing result to be output from an output unit 906 or transmitted from a communication unit 908 via the input/output interface 910 as necessary, and further, recorded on the hard disk 905, for example.

Note that, the input unit 907 includes a keyboard, a mouse, a microphone, and the like. Furthermore, the output unit 906 includes a Liquid Crystal Display (LCD), a speaker, and the like.

Here, in the present specification, the process performed by the computer in accordance with the program does not necessarily have to be performed chronologically in the order described as the flowchart. That is, the process performed by the computer in accordance with the program also includes processes executed in parallel or individually (for example, parallel process or process by an object).

Furthermore, the program may be processed by one computer (processor) or may be distributed and processed by a plurality of computers. Moreover, the program may be transferred to a remote computer and executed.

Moreover, in the present specification, a system means a set of a plurality of constituents (device, module (component), and the like), and it does not matter whether or not all of the constituents are in the same cabinet. Thus, a plurality of devices that is accommodated in a separate cabinet and connected to each other via a network and one device that accommodates a plurality of modules in one cabinet are both systems.

Note that, the embodiment of the present technology is not limited to the embodiments described above, and various modifications are possible without departing from the scope of the present technology.

For example, the present technology can adopt a configuration of cloud computing that shares one function in a plurality of devices via a network to process the function in cooperation.

Furthermore, each step described in the above flowchart can be executed by sharing in a plurality of devices, other than being executed by one device.

Moreover, in a case where a plurality of processes is included in one step, the plurality of processes included in the one step can be executed by being shared in a plurality of devices, other than being executed by one device.

Furthermore, the advantageous effects described in the present specification are merely examples and are not limited to them, and other effects may be included.

REFERENCE SIGNS LIST

10 Image processing system
11 Encoder
21 A/D conversion unit
22 Screen rearrangement buffer 22
23 Calculation unit
24 Orthogonal transform unit
25 Quantization unit
26 Lossless encoding unit
27 Accumulation buffer
28 Inverse quantization unit
29 Inverse orthogonal transform unit
30 Calculation unit
31*a*, 31*b* Deblocking filter
32 Frame memory
33 Selection unit
34 Intra prediction unit
35 Motion prediction/compensation unit
36 Predicted image selection unit
37 Rate control unit
41 Adaptive offset filter
42 ALF
51 Decoder
61 Accumulation buffer

62 Lossless decoding unit
63 Inverse quantization unit
64 Inverse orthogonal transform unit
65 Calculation unit
67 Screen rearrangement buffer
68 D/A conversion unit
69 Frame memory
70 Selection unit
71 Intra prediction unit
72 Motion prediction/compensation unit
73 Selection unit
81 Adaptive offset filter
82 ALF
261 Boundary strength calculation unit
310 Decision unit
311 Filtering decision unit
312 Filtering strength decision unit
320 Filtering unit
330 Line buffer
340 Controller
901 Bus
902 CPU
903 ROM
904 RAM
905 Hard disk
906 Output unit
907 Input unit
908 Communication unit
909 Drive
910 Input/output interface
911 Removable recording medium

The invention claimed is:

1. An image processing device comprising:
a decoder configured to decode a bitstream to generate a decoded image;
processing circuitry configured to, in a case where a chroma format is a 422 format, decide whether or not a deblocking filter is applied to chroma pixels neighboring a vertical block boundary of 4 pixels by using chroma pixels belonging to first and fourth horizontal lines within the vertical block boundary and to, in a case where a chroma format is a 444 format, decide whether or not the deblocking filter is applied to chroma pixels neighboring a vertical block boundary of 4 pixels by using chroma pixels belonging to the first and fourth horizontal lines within the vertical block boundary and decide whether or not the deblocking filter is applied to chroma pixels neighboring a horizontal block boundary of 4 pixels by using chroma pixels belonging to first and fourth vertical lines within the horizontal block boundary; and
a filter configured to apply the deblocking to the chroma pixels for which it is decided by the processing circuitry that the deblocking filter is applied.

2. An image processing method comprising:
decoding a bitstream to generate a decoded image;
deciding, in a case where a chroma format is a 422 format, whether or not a deblocking filter is applied to chroma pixels neighboring a vertical block boundary of 4 pixels by using chroma pixels belonging to first and fourth horizontal lines within the vertical block boundary and deciding, in a case where a chroma format is a 444 format, whether or not the deblocking filter is applied to chroma pixels neighboring a vertical block boundary of 4 pixels by using chroma pixels belonging to the first and fourth horizontal lines within the vertical block boundary and deciding whether or not the deblocking filter is applied to chroma pixels neighboring a horizontal block boundary of 4 pixels by using chroma pixels belonging to first and fourth vertical lines within the horizontal block boundary; and
applying the deblocking to the chroma pixels for which it is decided by the processing circuitry that the deblocking filter is applied.

3. An image processing device comprising:
a decoder configured to decode a bitstream to generate a decoded image;
processing circuitry configured to, in a case where a chroma format is a 422 format, decide whether or not a deblocking filter is applied to chroma pixels neighboring a vertical block boundary of 8 pixels by using chroma pixels belonging to first, fourth, fifth, and eighth horizontal lines within the vertical block boundary and to, in a case where a chroma format is a 444 format, decide whether or not the deblocking filter is applied to chroma pixels neighboring a vertical block boundary of 8 pixels by using chroma pixels belonging to the first, fourth, fifth, and eighth horizontal lines within the vertical block boundary and decide whether or not the deblocking filter is applied to chroma pixels neighboring a horizontal block boundary of 8 pixels by using chroma pixels belonging to first, fourth, fifth, and eighth vertical lines within the horizontal block boundary; and
a filter configured to apply the deblocking to the chroma pixels for which it is decided by the processing circuitry that the deblocking filter is applied.

4. An image processing method comprising:
decoding a bitstream to generate a decoded image;
deciding, in a case where a chroma format is a 422 format, whether or not a deblocking filter is applied to chroma pixels neighboring a vertical block boundary of 8 pixels by using chroma pixels belonging to first, fourth, fifth, and eighth horizontal lines within the vertical block boundary and deciding, in a case where a chroma format is a 444 format, whether or not the deblocking filter is applied to chroma pixels neighboring a vertical block boundary of 8 pixels by using chroma pixels belonging to the first, fourth, fifth, and eighth horizontal lines within the vertical block boundary and deciding whether or not the deblocking filter is applied to chroma pixels neighboring a horizontal block boundary of 8 pixels by using chroma pixels belonging to first, fourth, fifth, and eighth vertical lines within the horizontal block boundary; and
applying the deblocking to the chroma pixels for which it is decided by the processing circuitry that the deblocking filter is applied.

5. The image processing device of claim 1, wherein the deblocking filter calculates a boundary strength using color difference parameters related to a color difference.

6. The image processing method of claim 2, wherein the deblocking filter calculates a boundary strength using color difference parameters related to a color difference.

7. The image processing device of claim 3, wherein the deblocking filter calculates a boundary strength using color difference parameters related to a color difference.

8. The image processing method of claim 4, wherein the deblocking filter calculates a boundary strength using color difference parameters related to a color difference.

9. The image processing device of claim 5, wherein the color difference parameters include a flag indicating presence or absence of a coefficient of a U component.

10. The image processing method of claim 6, wherein the color difference parameters include a flag indicating presence or absence of a coefficient of a U component.

11. The image processing device of claim 7, wherein the color difference parameters include a flag indicating presence or absence of a coefficient of a U component.

12. The image processing method of claim 8, wherein the color difference parameters include a flag indicating presence or absence of a coefficient of a U component.

* * * * *